United States Patent [19]

Daigle

[11] Patent Number: 5,795,297
[45] Date of Patent: Aug. 18, 1998

[54] ULTRASONIC DIAGNOSTIC IMAGING SYSTEM WITH PERSONAL COMPUTER ARCHITECTURE

[75] Inventor: Ronald E. Daigle, Redmond, Wash.

[73] Assignee: Atlantis Diagnostics International, L.L.C., Bothell, Wash.

[21] Appl. No.: 712,828

[22] Filed: Sep. 12, 1996

[51] Int. Cl.⁶ .................................................. A61B 8/00
[52] U.S. Cl. ............................................... 600/447
[58] Field of Search .................... 128/660.07, 660.08, 128/660.09, 660.1, 661.01; 600/443, 444, 445, 446, 447

[56] References Cited

U.S. PATENT DOCUMENTS 5,590,658  1/1997  Chiang et al. .................. 128/661.01

FOREIGN PATENT DOCUMENTS

WO 95/15521  6/1995  WIPO .

*Primary Examiner*—George Manuel
*Attorney, Agent, or Firm*—W. Brinton Yorks, Jr.

[57] ABSTRACT

An ultrasonic diagnostic imaging system is provided with a personal computer platform which processes digital echo signals and produces ultrasonic image signals for display. The expansion bus structure of the personal computer platform accommodates ancillary processors such as beamformer cards, digital signal processing cards, video cards, and network cards which may be necessary or desirable for the ultrasound system. In a preferred embodiment the digital signal samples produced by a beamformer connected to the expansion bus are processed for display by software executed by the CPU of the personal computer platform. A preferred software architecture for the personal computer based ultrasound system consists of multiple object oriented software tasks, executing under a realtime, multitasking operating system which is both efficient and robust. Performance upgrades of the entire ultrasound system are effected by simple replacement of the CPU with a higher performance CPU, thus providing continual ultrasound system performance improvements in consonance with the evolution of personal computer CPU technology.

69 Claims, 12 Drawing Sheets

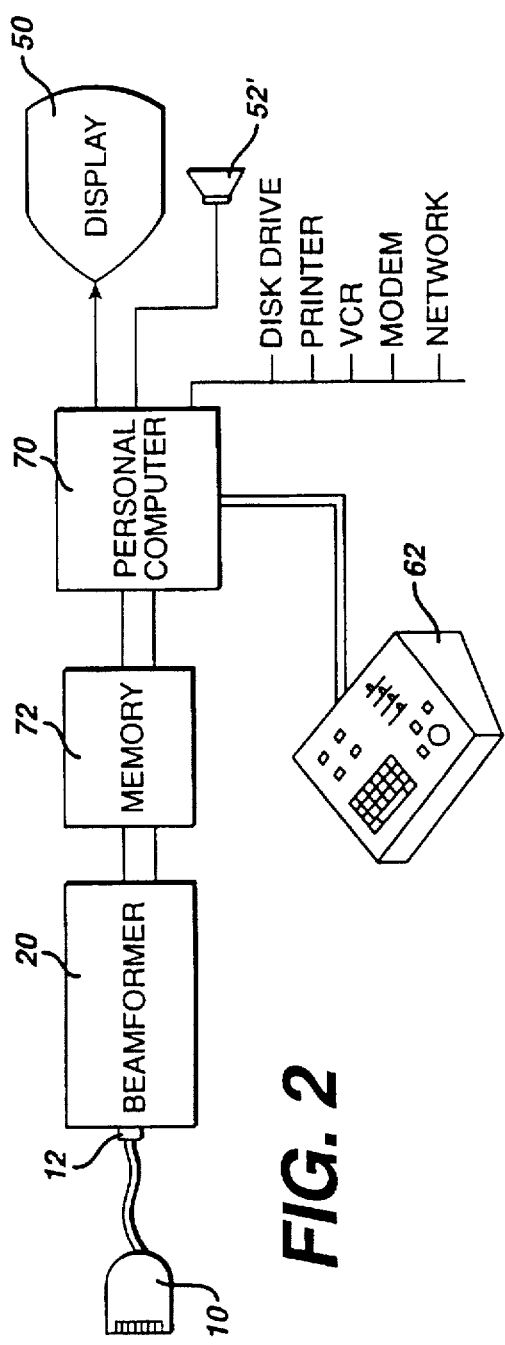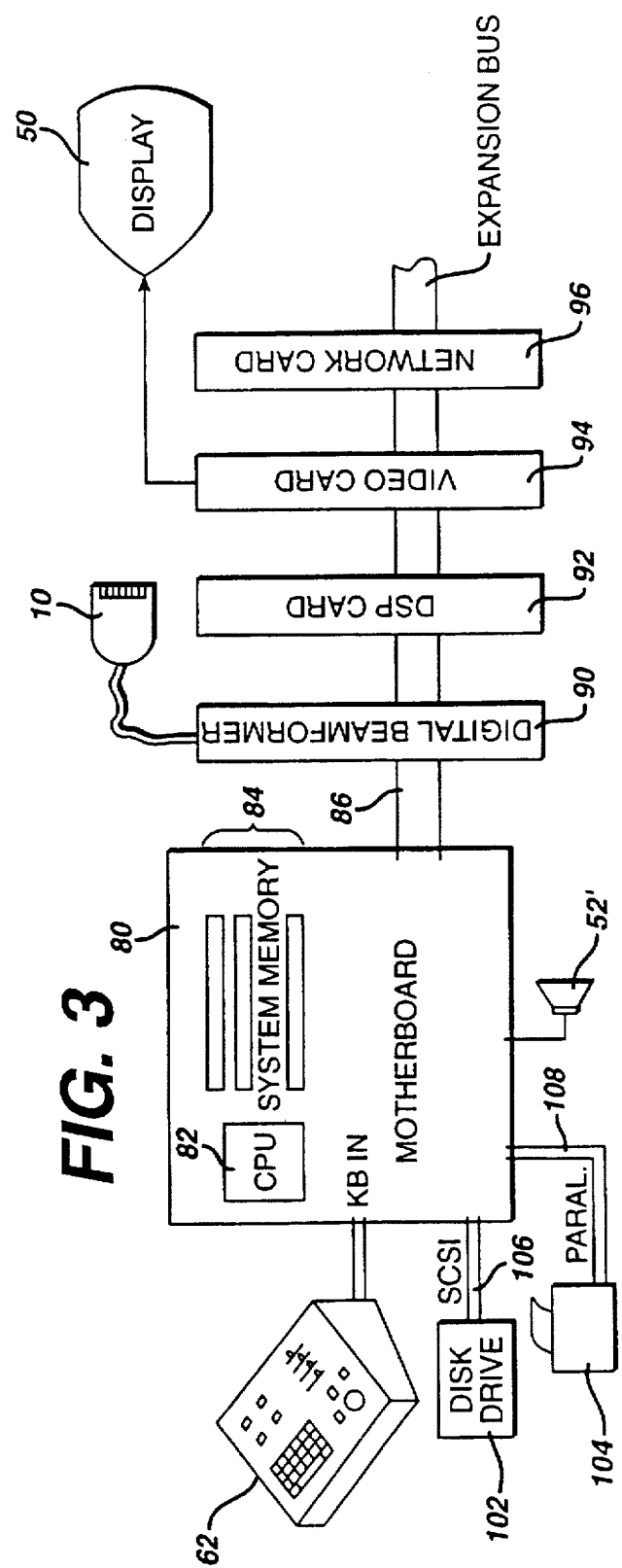
FIG. 2
FIG. 3

ULTRASONIC DIAGNOSTIC IMAGING SYSTEM WITH PERSONAL COMPUTER ARCHITECTURE

This invention relates to ultrasonic diagnostic imaging systems and, in particular, to ultrasonic diagnostic imaging systems designed for a personal computer platform.

Early ultrasound systems were simple laboratory devices. A piezoelectric transducer crystal would be wired to a waveform generator circuit to drive the transducer and to an amplifier circuit which would receive and amplify the echoes received by the crystal. The received echoes would trigger a sweep of a single line of echoes across the screen of an oscilloscope, enabling the researcher to determine the depths from which the echoes were produced.

A single line of echoes was an extremely restrictive display, however, leading to the development of two dimensional imaging systems. Since the simplest method of scanning a region with a number of adjacent lines was to move the crystal, mechanical sector scanners were soon developed with circuits to control the mechanical scanning and to translate the scanning motion into positional coordinates for display of the lines. To simultaneously display the sequentially produced lines, storage tubes with long persistent phosphors were used.

The reliability problems inherent in mechanical scanners led to the desire to eliminate such mechanisms and linear array transducers began to debut. Linear arrays introduced other circuitry into the system, either switching circuits to sequentially connect different elements of the array to the amplifier, or a proliferation of individual amplifiers for each transducer element. The latter approach was greatly aided by advances in microelectronics such as the operational amplifier. Storage tubes for two dimensional displays became obsolete with the development of digital scan converters capable of creating images in the desired display format and storing the images for display.

This constant evolution of new circuits for ultrasound instruments and the expected continuation of the proliferation of new and different circuitry led to an obvious response by companies manufacturing ultrasound systems: modularity. With circuits packaged as separate modules, the modules could be readily replaced with new, more advanced modules as they become available, and modules with new and different functions could be connected to those of an existing system. By the mid 1970's most companies had modularized their products, typified by the Mark III Echocardiography System of Advanced Technology Laboratories, Inc. The Mark III ultrasound system consisted of three or four modules mounted on top of each other in a wheeled, nineteen inch rack. In a typical configuration the Mark III system included a pulsed echo module, a DSC (digital scan converter) module, a video display module, and a strip chart recorder module. The Mark III system exhibited an arrangement of functions that is still typical of today's ultrasound systems. The pulsed echo module was a "front end" module that controlled transmission and responded to reception by the ultrasound probe for various types of scanning (e.g., M-mode, A-mode, or sector scanning). The DSC module was a "back end" module that performed signal postprocessing and digital scan conversion for M-mode, A-mode, Doppler, or two dimensional imaging. The resultant images would be displayed in real time on the video display module or recorded on the strip chart recorder module. Each module came with its own set of controls and knobs on the front of the module by which the module's functions could be adjusted or changed. The system could be upgraded to new or different functionality by replacing or adding modules to the nineteen inch rack.

The 1980's saw a further evolution to modularity, the construction of modules as unique printed circuit boards, all of which would plug into a card cage with a common backplane board. The backplane board provided the necessary interconnection of the modules and would be connected by cables to a single control panel for all of the modules. Advances in digital electronics led to increased complexity and sophistication of the modules as the modules began to become populated with numerous microprocessors, and each module began to assume the characteristics of a unique, special purpose processor.

The present inventor has observed this evolution and has noted that the essence of this hardware architecture, modularity, has in reality become greatly diminished. While it is true when servicing such systems that a modular printed circuit board can be easily removed and replaced with an identical new board, modularity for purposes of design and upgrading often requires changes to many modules, as if they were fixed components of a dedicated system. In particular, the software of the various modules often becomes intertwined in complex ways, and must be carefully controlled. Adding a new probe with a different number of transducer elements, for instance, would require modifications to the beamformer to drive and receive signals from the elements and to form beams from the new number of elements, and to other modules to process a new number of beams from the probe and to scan convert the new number of scanlines into an image for display. Software for each module must usually be modified in closely coordinated ways. The addition of this one probe requires a sequence of changes throughout virtually the entire system, each of which is dependent upon and needs to interact with changes made in preceding system functions. And if subsequent modifications disturb one of these changes, the entire sequence for operation of the new probe is upset.

Disdaining this conventional wisdom of ultrasound system design, the present inventor has determined that it is no longer necessary for ultrasound systems to possess such intensity of specialized processors and modules. The present inventor has calculated the level of pure computing power that is necessary to carry out all of the functions of a modern ultrasonic imaging system in real time. He has found that a processor with a processing power (or bandwidth) of approximately 200 MIPS (millions of instructions per second) is capable of performing all of the signal and display processing needed for a typical ultrasound system. Many of the current proprietary workstations from companies such as Sun Microsystems, Digital Equipment Corporation, Hewlett-Packard and Silicon Graphics Inc. are capable of this level of performance. But even more significantly, personal computers (PCs) for the consumer market which contain high speed central processing units (CPUs) such as the Intel Pentium® chip and the Motorola Power PC™ chip are also now approaching or are already capable of this level of performance. This opens the possibility of using a commercially available workstation or a PC with its open architecture as the processor for most if not all of the functions of an ultrasound system. Instead of simply conditioning the modules before scanning begins and passively monitoring the user controls during scanning, which are the typical functions of the system controller in a modern ultrasound machine, a high performance workstation or PC can perform all of the system controller function as well as carry out all of the processing of the echo signals needed to form and display a high quality ultrasonic image.

In accordance with the principles of the present invention, an ultrasound system is provided which utilizes a personal computer architecture. The CPU of a PC or workstation is used for most if not all of the processing of ultrasonic echoes for image formation. In a preferred embodiment the expansion slots of the PC are used to install features such as beamformer cards, a video card, a digital signal processing card, and a network card. The expansion cards augment the capabilities of the PC's CPU by being bussed to the CPU, just as they do in the home personal computer. And, as in the home personal computer, virtually all of the operations of the system are performed by software on or under control of the CPU. In accordance with a preferred embodiment of the present invention the CPU is operated by a multitasking scheduler which allocates and apportions the time of the CPU among a plurality of prioritized tasks which are competing for access to the CPU. The scheduler schedules tasks for execution by the CPU as real time events occur and regulates the time periods in which tasks are executed, balancing the processing power available among the required functions so that the flow of ultrasound data is continually processed and displayed. The preferred architecture of this software based system design is an object oriented design, in which software tasks are separately designed and modified in an encapsulated form which assures their independence and ability to flexibly operate on and discern the needs of any object data set presented to them. This provides benefits of modularity and quality assurance which have become lost in the evolution of modular hardware based architectures.

The PC or workstation based software architecture of the present invention provides an overwhelming advantage over hardware based designs: the ability to follow the ever increasing performance levels of workstations and PCs. The performance of an ultrasound system is limited by the total processing power of the system. In an embodiment of the present invention, the performance level of virtually every operation is determined by the capability of a single component—the CPU. Thus, virtually every function of an ultrasound system of the present invention can be enhanced or improved by replacing a single system component, the CPU chip. Ultrasound systems will become faster and more powerful, enabling improved functionality and versatility, by the simple expedient of replacing this single component or, at most, porting the software architecture to a new motherboard and CPU. Improved performance in the ultrasound industry will be provided automatically by the natural evolution of workstations and PCs in the computer industry.

In the drawings:

FIG. 2 illustrates in block diagram form a personal computer ultrasound system architecture of the present invention;

FIG. 3 is a more detailed block diagram of a personal computer ultrasound system architecture of the present invention;

FIG. 9 illustrates color flow imaging which may be performed in accordance with the flowcharts of FIGS. 8 and 8a;

FIG. 11 illustrates simultaneous 2D and M-mode imaging which may be performed in accordance with the flowcharts of FIGS. 8 and 8a.

In the typical ultrasound system of the prior art, ultrasound echoes are processed by a series of serially connected, special purpose circuits. As echoes are received they are immediately and continually processed and displayed. In analog systems, scanning and processing are operated synchronously, for analog echo signals have to be processed immediately and continuously upon reception. The pacing item for the receiver is the transmitter, for once an ultrasonic pulse is transmitted, the receiver has to immediately react by fully and continuously processing the echo signals as they are received. In a typical prior art system, modules performing the specialized functions of an ultrasound system are connected together under direction of a central controller to process ultrasonic echoes.

Figure 1:
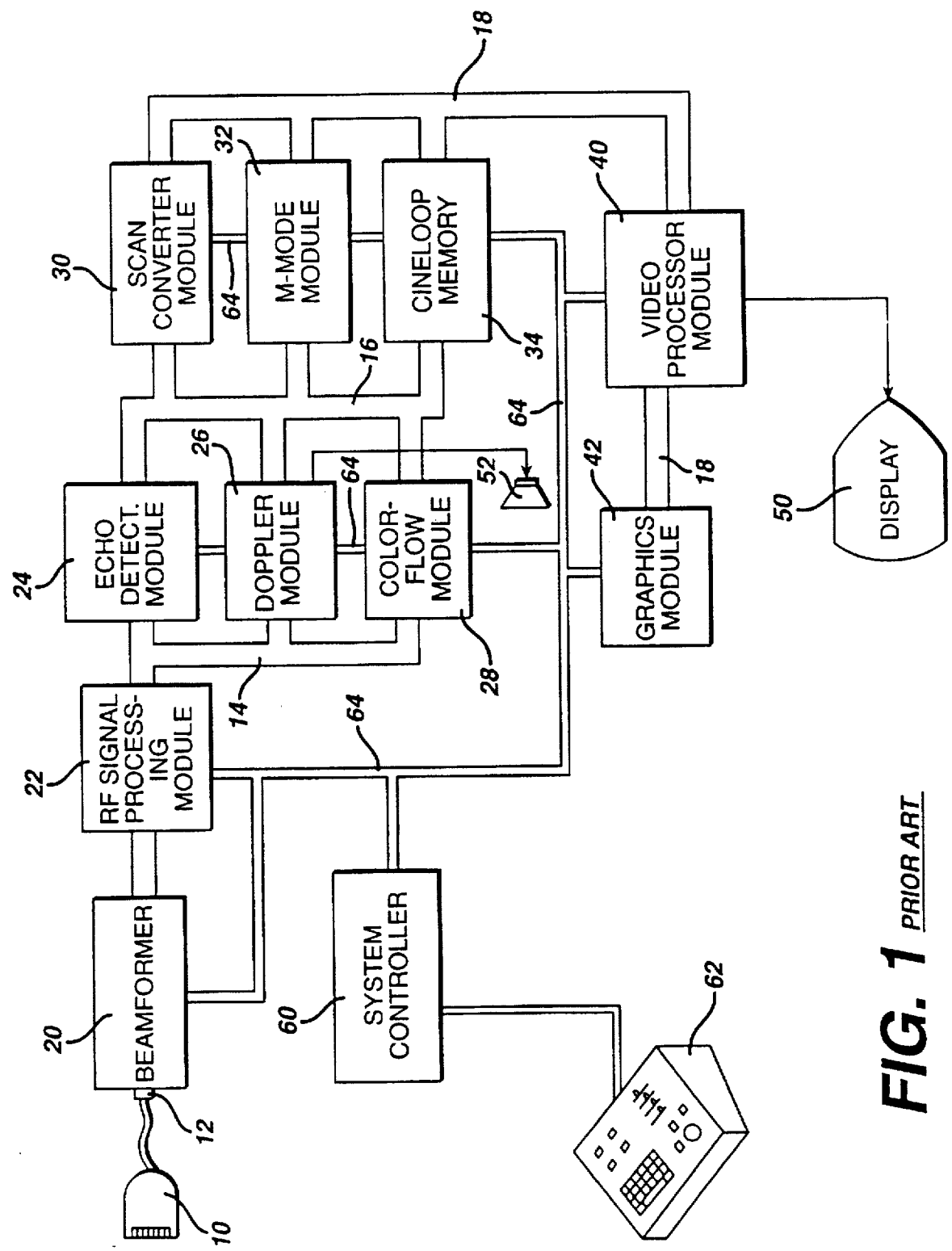
FIG. 1 illustrates in block diagram form a typical modular hardware based ultrasound system architecture of the prior art.

Referring to FIG. 1, a typical modular hardware based ultrasound system architecture is shown. An ultrasound probe, such as a linear array transducer 10, is plugged into a connector 12 of a beamformer module 20 which controls transmission and reception by the probe. The beamformer module 20 forms beams (or scanlines or raylines) of received ultrasonic echoes, which are coupled to an RF (radio frequency) signal processing module 30 for signal preprocessing such as amplification and bandpass filtering. The RF signals are then coupled by a bus 14 to the inputs of an echo detection module 24, a Doppler module 26, and a colorflow module 28. If the echoes are to be processed to form a two dimensional (2D or B mode or greyscale) image, the echo detection module 24 is actuated to detect and process the echoes to form 2D echo signals. If the echoes are to be processed to form a spectral or audio Doppler display they are processed to form Doppler signal estimates and a modulated audio signal for a speaker 52. If the echoes are to be processed to form the color components of a colorflow Doppler display they are Doppler processed by colorflow module 64. The signals processed by modules 24, 26, or 28 are coupled over a bus 16 for image processing by the appropriate image formation module. The 2D signals from the echo detection module 24 may be converted into the desired image format by a scan converter module 30, or converted into an M-mode display by an M-mode module 32. The M-mode module can also be used to form a spectral display of signals produced by the Doppler module 26, or a separate, specialized spectral display module may be provided. Signals from the colorflow module 28 and the echo detection module 24 can be provided to the scan converter module 30 where they are combined to form a colorflow image in the desired format. A Cineloop® memory 34 stores sequences of pre-scan converted or post-scan converted images for subsequent replay as video loops or real time or slow motion image sequences.

The images produced by the scan converter module, M-mode module, or Cineloop memory are coupled over a bus 18 to a video processor module. which produces video output signals of a form required by an image display 50. The ultrasonic image may be combined with alphanumeric or graphic information such as a patient's name or scale markers or measurements drawn over the image by the operator. This graphical information is provided to the video processor module 40 by graphics module 18 over bus 18, where it is combined for display with the ultrasound image on display 50.

The modules of the system of FIG. 1 are operated under control of a system controller 60, which is connected to each module by a control bus 64. The term system controller implies a greater purpose than is actually the case. for the system controller is generally little more than an interface between the user controls 62 and the system modules. As the operator manipulates the controls to select a probe and a particular type of imaging procedure, for instance, the system controller responds and commands the beamformer to load the necessary data to operate the probe, and commands the other modules to be prepared to process and display the ultrasonic information as desired by the operator. Once the modules have been appropriately initialized, the system controller generally lapses into inactivity as it awaits a new order from the user controls. This is because each of the modules is an independently operating unit with its own microprocessor(s) dedicated to the functions of the module. Customarily each module consists of one or more separate printed circuit boards. The system controller 60, dedicated as it is to monitoring the user controls and occasionally intervening with new setup instructions to a module, itself never processes a single ultrasonic echo signal.

One limitation of the modular hardware architecture is that the operation of a sequence of modules is only as efficient as the slowest module in the sequence. Thus, there is an ever present need to design each module to perform its dedicated function at the highest speed possible. In particular, it is desirable for each successive module to perform its functions faster or at least as fast as the previous module, so that there is no possibility that a module will be overwhelmed by incoming data. When an intermediate or later module in the sequence becomes unable to keep up with the data flow, it and the preceding modules become backed up with data, overflow, data sets become incomplete or unsynchronized, or the system "crashes." These factors result in each module being designed with numerous, perhaps dozens, of high speed microprocessors. A typical high performance ultrasound system generally includes enormous computing power residing in dozens if not scores of microprocessors dedicated to different module functions. This enormous computing power is rarely, if ever, all used at once, however, since numerous modes of operation use only a subset of the available processing modules and their capabilities.

A block diagram of an ultrasound system constructed in accordance with the principles of the present invention is shown in FIG. 2. As this drawing shows, the central component of the ultrasound system is a personal computer platform 70. As used herein the term personal computer refers to workstation and personal computer platforms with both open and proprietary architecture. As in FIG. 1, an ultrasound probe transmits ultrasonic waves and receives ultrasonic echoes, which are formed into raylines by a beamformer 20. The raylines are stored in a memory 72, where they are accessed by the personal computer 70. The scanlines are processed by the personal computer as commanded by the settings of the user control panel 62, and the resulting image is transmitted for display on a display 50.

Thus, all of the processing required to process and convert the ray line signals produced by the beamformer into video image signals is performed by the personal computer 70.

A number of ancillary peripheral devices are connected to the standard personal computer buses and connectors, including a disc drive, printer, VCR, modem and a network link. The audible Doppler signals are produced by a built-in audio circuit driving the personal computer's standard speaker 52 which ordinarily produces the PC's familiar sounds and tones.

It is within the scope of the present invention to perform beamforming on the personal computer 70 also. It will be seen that a preferred embodiment of the present invention incorporates the beamformer as a standard expansion function of the PC. As personal computer chips evolve and become even more powerful, the preference will be to perform beamforming entirely by software on the PC. However, it has been found that a wide variety of today's current PC platforms are suitable for the present invention when beamforming is performed as an asynchronous expansion function as indicated in FIG. 2. By operating as an asynchronous expansion function the beamformer can be precisely timed to operate in real time without the need to wait to gain access to the CPU of the PC. This architecture also permits the adaptation of present day beamformers to the personal computer ultrasound system architecture, which conveniently also includes the high voltage sources required by many current ultrasound probes.

FIG. 3 is a more detailed block diagram of a personal computer based ultrasound system of the present invention. The drawing shows that, through judicious use of the personal computer's expansion bus, all of the functions of the ultrasound system are carried out by today's standard personal computer architecture. Central to the system is the personal computer's motherboard 80 with its CPU 82. Located on the motherboard 80 is system memory 84, high speed RAM which enables the ultrasound system to perform its functions in real time. The ultrasound system control panel 62 is connected to the PC's standard keyboard input, labeled "KB In." A hard disk drive 102 is connected to the PC's SCSI bus 106, and a printer 104 is connected to the PC's parallel port 108.

Personal computers come equipped with a number of expansion slots on the motherboard which are connected to a common expansion bus. As is well known, printed circuit expansion cards can be plugged into these slots to provide additional or enhanced capabilities for the PC which are directly compatible with the PC's architecture. Expansion cards such as video cards, sound cards, modem cards, network cards, and others may be plugged into the expansion slots and accessed through openings in the PC's case for connection to monitors, speakers, phone lines, and the like. The embodiment of FIG. 3 takes advantage of this architecture of PCs by adding capabilities to the standard PC which are desired for the ultrasound system. By connecting these capabilities through the expansion bus, the added functions are made directly compatible with the PC and the ultrasound system architecture. In the embodiment of FIG. 3, a digital beamformer 90, a DSP (digital signal processor) card 92, a video card 94, and a network card 96 are connected to the expansion bus of the motherboard 80. These cards provide additional ultrasound functionality which is directly compatible with the ultrasound system's PC architecture.

It is thus seen that the ultrasound system of FIG. 3 is substantially the same as the architecture of the typical personal computer found on an office desk or at home. The configuration of FIG. 3 is ideally suited to a desktop ultrasound machine which resembles a PC with a standard desktop case. But the present invention is adaptable to numerous physical configurations such as that of the plan view of FIG. 4, where the printed circuit boards of the arrangement are viewed edge-on from above. This arrangement is suitable to the form factor of current typical ultrasound systems and advantageously uses currently available ultrasound beamformer boards. The PC motherboard 80 is shown at the right in the drawing, with its CPU 82 and system memory 84. A floppy disk drive 110 is connected to the motherboard's standard disk controller connector 105 and a hard disk drive 102 and an optical disk drive 112 are connected to the motherboard's SCSI bus 106. The hard disk drive 102 retains software such as ultrasound applications, data tables for different probes (scanheads), and analysis and report programs, and the optical disk drive is used to store libraries of ultrasound images which may then be transported to other systems and workstations. The ultrasound system's control panel 62 is connected by a cable 114 to the keyboard input of the motherboard 80, with the trackball control 66 connected by a cable 116 to the mouse input of the motherboard.

An expansion bus board 120 is plugged into one of the motherboard's expansion bus sockets 86'. The expansion bus board 120 acts to extend the motherboard's expansion bus to an increased number of expansion bus sockets 122, which are spaced so as to accommodate connection to existing beamformer boards. The beamformer of this embodiment has three boards plugged into the expansion bus board 120, a beamformer controller board 130 and two beamformer channel boards 132. Connected at the ends of the beamformer boards opposite the expansion bus board is a scanhead connector board 140 which mounts two scanhead connectors 142, through which scanheads are connected to the ultrasound machine. A high voltage regulator board 134 is plugged into the scanhead connector board 140 to provide the necessary voltages to drive the piezoelectric elements of the scanheads. The scanhead connector board contains two empty sockets 136 which oppose two sockets on the expansion bus board, and which are available for expansion of the beamformer with additional channel boards.

Also connected to the expansion bus of the expansion bus board are a DSP card 92, a network card 96, and a video card 94. The video card 94 provides video output signals over a cable 54 for the system's display 50 and for a VCR 52. General purpose expansion cards of these types are presently commercially available and are suitable for these purposes. However, the system designer may alternatively desire to design special purpose cards tailored specifically for the ultrasound application. For instance, since ultrasound systems may be sold worldwide and need to operate with equipment of various video standards, the present inventor has elected to use a video card specially designed to produce video signals of various formats, such as NTSC, PAL, SECAM, interlaced, noninterlaced, and for VHS and SVHS VCRs. The specially designed video card has connectors providing video signals in each of these formats.

Figure 4:
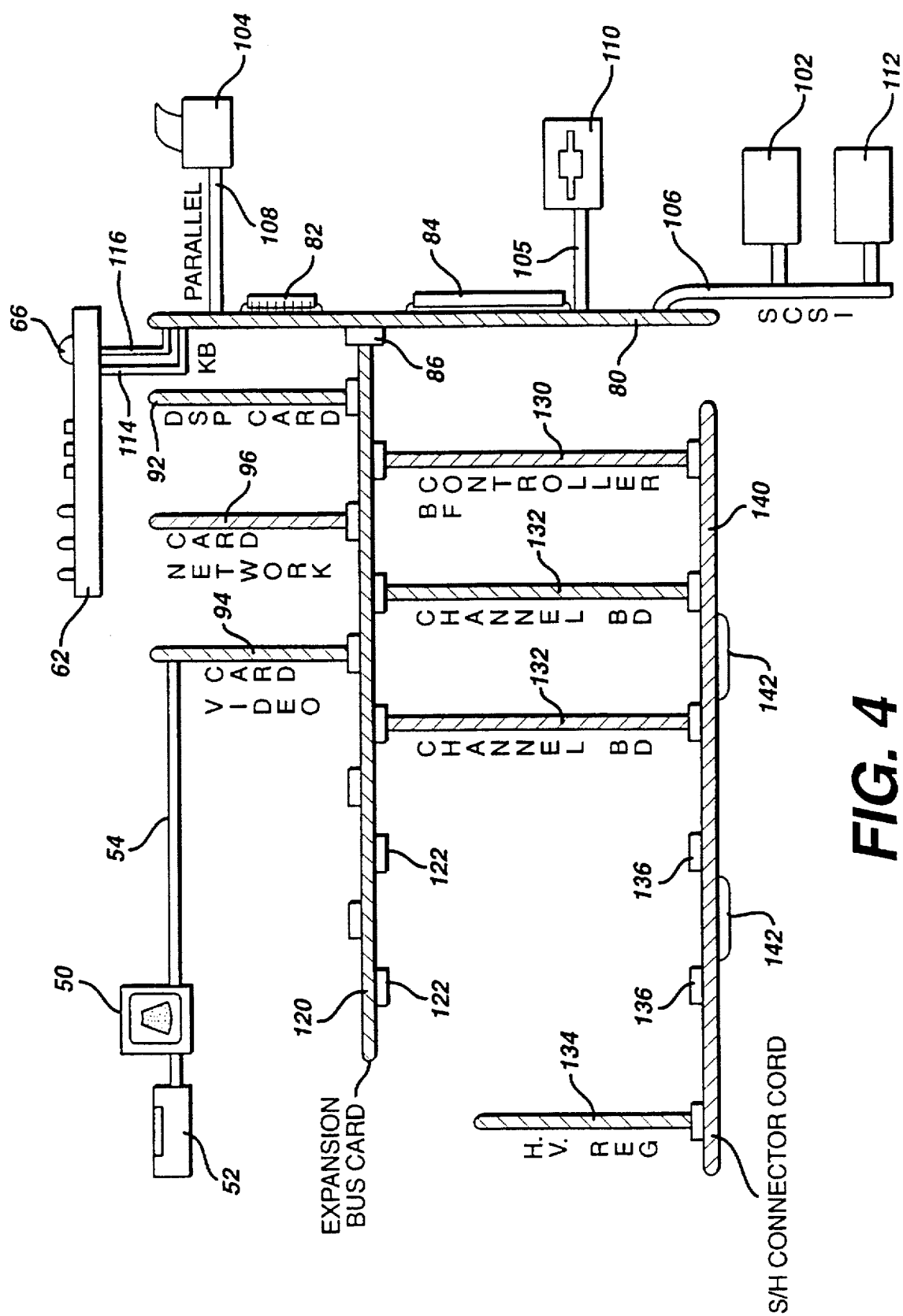
FIG. 4 is a plan view of the motherboard and expansion cards of a constructed embodiment of the present invention.

The arrangement of FIG. 4 may be easily mounted in a typical ultrasound system cart and utilizes currently existing beamformer board designs.

Unlike the typical hardware based ultrasound system architecture of the prior art, the PC based ultrasound system of the present invention relies extensively upon software to perform the operations and processing required by an ultrasound machine. The software of the system is organized into various "tasks" which are run on the CPU to process and display ultrasound image data.

Figure 5:
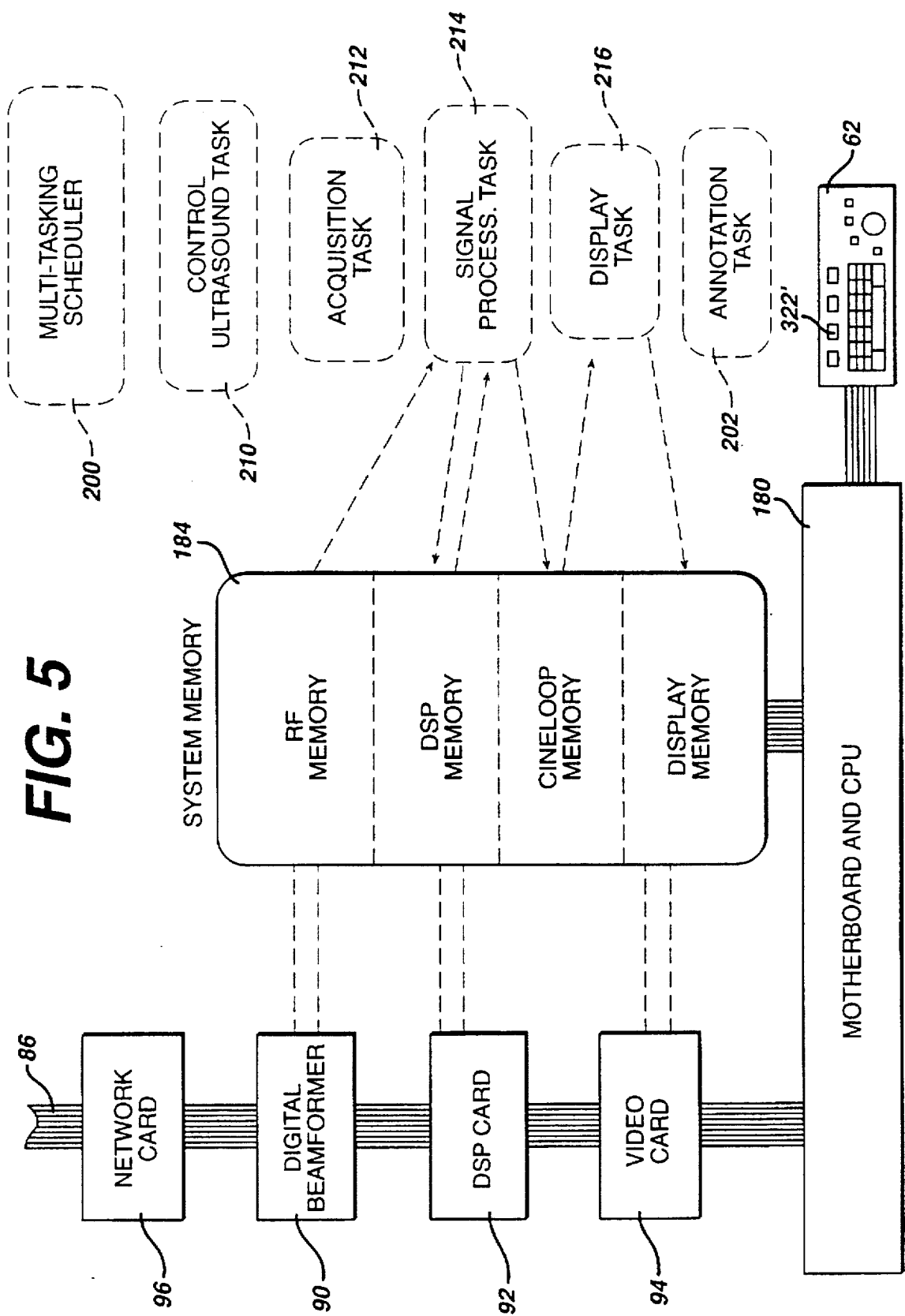
FIG. 5 is a block diagram of both the hardware configuration and software architecture of a personal computer ultrasound system of the present invention.

FIG. 5 illustrates the interaction of the hardware and software of a first embodiment of the present invention. The motherboard and CPU 180 is shown at the bottom of the drawing, connected to the control panel 62 and by the expansion bus 86 to expansion cards 90-96. In the center of the drawing is the system memory 184, logically partitioned into various memory areas. To the right are shown five principal software tasks, all operating through a multi-tasking scheduler 200. The multi-tasking scheduler makes possible the real time operating capability of the ultrasound system.

The multi-tasking scheduler 200 is a software program which determines which tasks get to use the CPU, and when. The software tasks are event and data driven, and request access to the CPU when an event occurs or when data needs processing. In a preferred embodiment, hardware components of the system generally generate an interrupt when an event occurs. The software tasks generally send a signal to the multi-tasking scheduler when they need to process data. The multi-tasking scheduler responds to these requests on a priority basis. In a constructed embodiment the multi-tasking scheduler 200 has 256 priority levels, ranging from the lowest priority of −128 to the highest priority of +128. The median priority value is zero. When a task requests access to the CPU the multi-tasking scheduler grants the request in consideration of the priority of the request and the priorities of the task currently running and those that are presently awaiting access to the CPU. Access to the CPU is granted by the multi-tasking scheduler for intervals of time called quantums.

Tasks have three possible states in the system. A sleeping task is a task which is not currently running and is waiting for an event to occur. All tasks which are not in one of the other possible states are sleeping, waiting for some event to happen.

A ready task is one that is not currently running, but is waiting to use the CPU. A task becomes ready when an event it has been awaiting has occurred, such as the arrival of new data for processing. When the event occurs, the task is now ready to run on the CPU. A ready task may be one which has not yet gained access to the CPU or, if it has previously gained access for the current event, has not yet finished its task.

A running task is currently using the CPU. It will continue to run until one of three things occur. First, a higher priority task becomes ready. When this happens, the multi-tasking scheduler preempts the current task and begins running the higher priority task. A second possibility is that the running task has reached a point where it needs input from an event. When a running task reaches this point it goes to sleep and awaits the event. The third possibility is that the running task has had control of the CPU for a full quantum of time. The multi-tasking scheduler is a timekeeper for the CPU and automatically generates its own interrupts after each quantum of time has expired. If a running task has not finished at that point, the multi-tasking scheduler interrupts the task and looks to see if another task of equal priority is awaiting access to the CPU. If there is one, the multi-tasking scheduler grants access to the CPU to the other task, and the task being interrupted drops to the ready state. The CPU will continue to service tasks of the same priority in a round-robin fashion, cycling from one to another until the processing required by each of them has been completed. The multi-tasking scheduler maintains a list of those tasks which are sleeping and those which are either running or ready. The multi-tasking scheduler will schedule tasks for execution by the CPU in accordance with these lists and in accordance with the priorities of the various tasks and the expiration of time quantums.

This time interleaved processing of tasks of the same priority illuminates another aspect of the present invention, which is the desirability of assigning the same priority to as many tasks as possible. When a number of tasks of zero priority (the neutral priority in this example) are ready, they will execute in round robin fashion until all tasks have been serviced. If an event occurs during this time which makes another zero priority task ready, the multi-tasking scheduler immediately suspends execution of the task which is currently running and schedules the newly ready task as the next task to gain access to the CPU. By this action, the newly ready task gains immediate access to the CPU and executes its response to the recently occurring event.

A simple example illustrates how this design philosophy maintains the real time capability of the ultrasound system. In a constructed embodiment the motherboard contains a real time clock which measures the passage of time. The system display displays the time of day in hours, minutes, and seconds. It is naturally desirable to have this time display change in uniform increments of seconds, not at irregular intervals. This is accomplished in the constructed embodiment by having the real time clock send an interrupt to the Annotation Task each time a second of time has passed. The Annotation Task is then ready to process this event, and the multi-tasking scheduler schedules the Annotation Task as the next task to have access to the CPU. The Annotation Task operates to update the display characters on the display screen, and the new time appears on the screen with the next display frame. To the operator, the display time appears to be counting time in even increments of a second.

After the Annotation Task has updated the display characters its operation is finished. The multi-tasking scheduler grants CPU access to the next ready task on its list, and the Annotation Task goes back to sleep to await another event.

The tasks illustrated in FIG. 5 are those that are central to ultrasound signal, image, and display processing in this embodiment. The Control Ultrasound Task 210 manages the control panel and directs overall system operation. The Control Ultrasound Task responds to operator changes to the system controls and sets up new or modified operation by the system in response to operator commands. The Control Ultrasound Task, as discussed below, verifies that changes in system operation have been effectively implemented, and mediates any disputes or conflicts among other tasks of the system.

The Acquisition Task 212 operates to acquire ultrasound data for storage in RF memory. The Acquisition Task generally performs this function through its direction and control of the digital beamformer 90, which produces ray-line data which is stored in predetermined locations in the RF Memory area of the system memory 184. The Acquisition Task can perform its function in other ways, such as by acquiring ultrasound data over a network through the network card 96 and storing the data in RF memory.

The Signal Processing Task 214 is executed by the CPU to process ultrasound data which has been acquired by the Acquisition Task. This includes functions such as filtering, amplification, detection, and Doppler frequency estimation. In the embodiment of FIG. 5, the Signal Processing Task is capable of processing data on the CPU of the personal computer, or of transferring data to the DSP Card 92 for processing as a subtask. When using the CPU for processing, the Signal Processing Task accesses data from RF Memory, appropriately processes the data, and stores the processed data (referred to herein as estimate data) in Cineloop Memory. When processing data on the DSP Card, the Signal Processing Task transfers the data to a DSP Memory area from which the data is accessed by the DSP Card, processed, and returned to the DSP Memory area. The Signal Processing Task then transfers the estimate data to Cineloop Memory.

The Display Task 216 is executed by the CPU to convert the estimate data produced by the Signal Processing Task into raster data for video display. The Display Task performs scan conversion for sector images by accessing R-θ data from Cineloop Memory and converting the processed data to the desired image format. The estimate data can be displayed in any desired image format by the Display Task, including sector, linear, or scrolling or swept temporal displays. The Display Task operates upon estimate data stored in Cineloop Memory and stores the results of its processing in the Display Memory area of system memory. The raster data stored in the Display Memory area is then automatically and continuously read by the Video Card 94 for the development of video output signals in a variety of video standards.

The Annotation Task 202, as illustrated above, controls the display of alphanumeric and graphical information, such as patient name, time, date, system information, cursors, pointers, depth markers, TGC curves, and measurements, on the ultrasound display. Since personal computers are designed in particular for such display information, a constructed embodiment of the present invention takes advantage of this fact by using the PC's native display capability for alphanumeric and graphical information. This native display generates a display overlay which contains alphanumeric and graphical display information in opaque display areas, with the remaining areas displayed as transparent. The display overlay is transmitted to the video card 94, where it overlays the ultrasound images from Display Memory to form a composite display with both the ultrasound image and its associated graphical and alphanumeric information. To the operator, the system is presenting only a single integrated visual display. If desired, the ultrasound image could be created in the PCs native display as well, given a sufficient number of colors and grey shades for the acceptable diagnostic image quality.

The various tasks are data-driven, meaning that a task is only carried out when the data needed for the task has become available. At all other times the tasks are sleeping, awaiting an event or data that will enable them to become ready and be scheduled for execution on the CPU by the multi-tasking scheduler. Other tasks, not shown, are also run by the system. A Doppler Audio Task, for instance, will operate on Doppler estimate data to generate Doppler sound for reproduction through the native sound port of the motherboard. Various Analysis and Report Tasks perform functions such as OB/GYN measurements and analysis, and the generation of diagnostic reports for the cardiologist, for example.

The system memory 184 may be physically located on the motherboard, or physically partitioned and located in different areas of the system. In a preferred embodiment the three memory areas connected to expansion cards by dashed lines in FIG. 5 are dual port memories for speed and efficiency and are physically located on the associated expansion cards. This enables the digital beamformer 90, for instance, to continually write RF ultrasound data to memory as it is received in real time, and for the Signal Processing Task to read and process the RF ultrasound data periodically and asynchronously at the same time. Similarly, the Signal Processing Task can transfer new RF data to the DSP Memory area while the DSP Card is processing data and returning estimate data to the DSP Memory. The dual port Display Memory enables the Display Task to develop an image for display in one partition of the Display Memory while the Video Card is reading and displaying an image previously developed in another partition of Display Memory. This physical partitioning of memory is not necessitated by any limitation of the PC architecture. A constructed embodiment of the present invention requires only 40 Mbytes of system memory, easily within the 128 Mbyte or greater capacity for RAM expansion of current personal computers and workstations. The constructed embodiment utilizes 32 bit memory addressing. This allows for significant expansion of system memory (up to 2 Gbytes). Each memory location in the system has its own unique address, allowing all system memory to be repartitioned, if desired, among the various operating tasks.

A preferred software structure for an embodiment of the present invention is based upon what is known as "object oriented design." Conventional software approaches in ultrasound generally employ procedural programming, in which the software functions are broken down into routines and subroutines which are called up when needed to perform certain specified operations. As processing is performed on ultrasound data the results of the processing and instructions for the next process are transferred through the system. The hardware modules perform the processing for which they are designed, and if a module is capable of alternative processes, it is instructed as to the process to be performed.

Object oriented design is a conceptually and operationally different approach. In object oriented design, software functions are classified and defined as "objects". These objects are independent and self-contained. Each object is encapsulated, meaning that it contains within itself all of the capabilities it requires to perform its duties. Each object is capable of functioning independently, without reliance on anything external to the object.

In the preferred embodiment, each ultrasound data set is defined as an object. With this design, each object oriented task is responsible for receiving object data and figuring out what to do with it.

A simple comparison illustrates these distinctions. In a conventional ultrasound system, Doppler raylines might be produced by an RF signal processing module and transmitted to the Doppler module, along with an instruction which says, "Here are ensembles of Doppler lines for rays ten through seventeen, with twelve lines per ensemble. Wall filter these lines with a filter characteristic of xyz, perform flash suppression of the wall filtered lines, and then estimate the Doppler frequency for fifty sample volumes on each rayline." In the object oriented design system of the present invention, the production of Doppler rayline data by the beamformer causes the Acquisition Task to send a signal to the Signal Processing Task which says, "New data is ready." In fact, this is the only signal sent by the Acquisition Task, no matter what kind of rayline data has been acquired. Furthermore, this is the only message sent by one task to any other task during ultrasonic imaging in the system.

This simple message system has three significant ramifications. One is that it is incumbent upon each task to figure out what needs to be done with the data that is presented to it. As will be shown, object oriented design characteristics of encapsulation and object attributes make this possible. Another ramification is that there are no inherent limitations on the functions that a task can perform. Since a task receives a message with no processing or performance restrictions, only the announcement that "New data is ready," the ability to upgrade or improve a task in the future with new capabilities is unrestricted by the message system. A third ramification is that, since the task must be encapsulated to perform whatever processing is needed on its own, there cannot be any fragile links or reliance upon other components or software of the system. Being thus self-contained, once a task or an object has been designed, created and tested, it cannot become "broken" by modifications or changes elsewhere in the system at some later date. This results in an inherently more stable and reliable software architecture.

Figure 6:
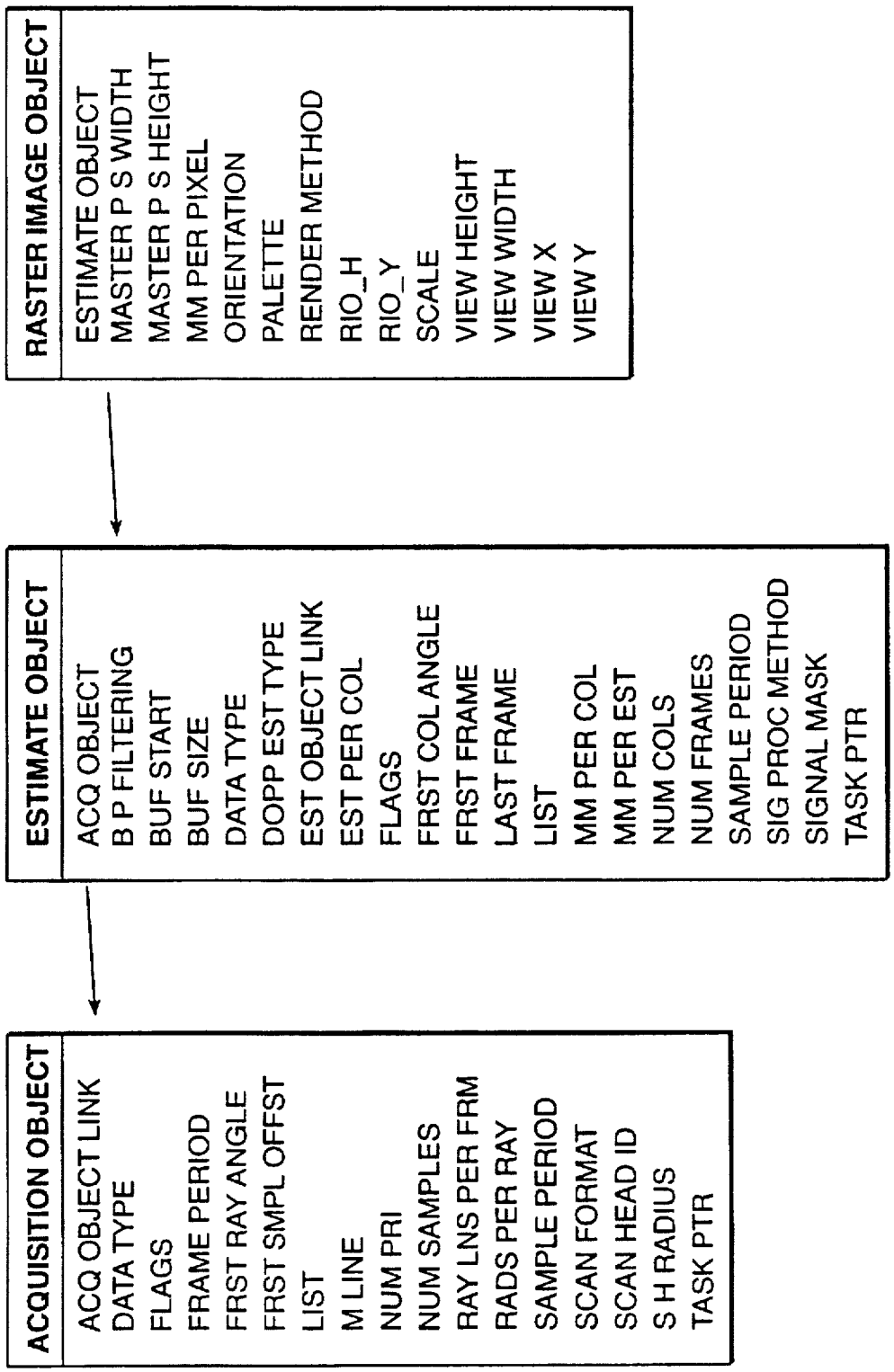
FIG. 6 illustrates three typical objects of the object oriented software design of a preferred embodiment of the present invention.

FIG. 6 illustrates three classes of data objects used for ultrasound image formation in a preferred embodiment of the present invention, an Acquisition Object, an Estimate Object, and a Raster Image Object. Each object contains a number of attributes of that particular object, which are listed below each object class heading. The attributes list characteristics of the data associated with the object, which fully define and describe the particular set of data. Based upon the attributes, tasks within the ultrasound system will figure out how to process and display the data.

The first data object in this example, the Acquisition Object, lists attributes of an acquired data set. Acquisition Objects are generally created and managed by the Acquisition Task. The first attribute, DataType, defines the data set as 2D (greyscale or B mode) or Doppler data. The FramePeriod attribute defines the time interval during which an entire image frame is acquired. The FrstRayAngle attribute defines the angular inclination of the first rayline of the image. This could be, for instance a 45° angle for the first line of a sector scan or 0° for the first line of a linear scan. The FrstSmpleOffst attribute defines the time or distance interval between the surface of the scanhead or the apex of a sector and the first sample location on a rayline. The NumSamples attribute defines the number of samples along a rayline, and the NumPRI attribute defines the number of lines of a Doppler ensemble when the data is Doppler data, or the number of 2D lines which are averaged to form an M-mode line when the data is M-mode data.

The List attribute points to records of information unique to the particular data set, such as the rayline numbers encompassed by the data set. These records could define the current data set as comprising raylines 16–32 of the image, for instance.

The TaskPtr attribute is used to point to a task which is different from the normal sequence of operation. For example, Acquisition Object data normally is transmitted to the Signal Processing Task for the next step in image processing. If, however, the operator would like the data set to be sent to storage on the hard disk or other storage media without any intermediate processing, the TaskPtr attribute would point to a Data Storage Task for the next process. Similarly, if an estimate data set is to be stored directly on disk without scan conversion or display, the TaskPtr attribute of the Estimate Object would point to the Data Storage Task, thereby avoiding accessing the Display Task.

The TaskPtr attribute can also be used to reorder the objects completely. For instance, TaskPtr can point from the Acquisition Object to the Display Task, causing the Display Task to scan convert RF data sets prior to signal processing. The scan converted RF data can be immediately processed by the Signal Processing Task and displayed, or can be stored and later processed and displayed. As discussed below in conjunction with the embodiment of FIG. 12, this versatility can make it is possible to process the same data set in multiple ways.

SamplePeriod is an attribute used to coordinate the rates of ultrasound data acquisition and signal processing. As the Signal Processing Task processes acquired data sets it periodically computes, on average, the time spent to process one sample of acquisition data. This computation is placed in the SamplePeriod attribute of the Estimate Object and periodically monitored by the Control Ultrasound Task. The Acquisition Task performs the same computation for the average time to acquire an ultrasound data sample, which is placed in the same attribute of the Acquisition Task and also reviewed by the Control Ultrasound Task. If the Control Ultrasound Task notes that the Estimate Object's SamplePeriod is becoming longer than that of the Acquisition Object, the Control Ultrasound Task will conclude that RF Memory is filling up with new ultrasound data at a rate faster than the data can be processed by the Signal Processing Task. The Control Ultrasound Task will then command the Acquisition Object to use a new, longer SamplePeriod value, which the Acquisition Task implements by commanding the beamformer to decrease the rate of its transmitted pulses (PRI). The acquisition data rate is thereby decreased, preventing new ultrasound data from overwriting unprocessed data in the RF Memory. This affords an economy in the amount of memory which needs to be designated for the RF Memory.

The Flags attribute is the only other attribute of the Acquisition Object which can be modified by another task. The Flags attribute contains one or more bits which are set when the associated data set is ready for signal processing. When the Signal Processing Task examines an Acquisition Object it looks to see if this bit or bits have been set to determine whether the data set of the Object requires processing. If a Flags bit has been set the Signal Processing Task will process the data and, when processing is complete, the Signal Processing Task resets the Flags bit. The beamformer, when writing new data to the RF memory, is continually overwriting old data. Before it does so, it checks to see if the Flags bits for the data to be overwritten has been reset. If Flags bits have not been reset the beamformer knows that the data has not been processed, and must wait for that area of RF Memory to become available.

The AcqObjectLink attribute, as discussed below, provides the means to link multiple Acquisition Objects together for the current imaging operation.

The other Acquisition Object attributes are self descriptive, and are given as examples of only some of the attributes which a system designer may employ. There is no limitation to the attributes which may be used for an object.

Similarly, the Estimate Object contains attributes which relate to the estimate data sets produced by the Signal Processing Task. The AcqObject attribute, as discussed below, is a pointer to the Acquisition Object defining the data set to be signal processed. Using the Acquisition Object and the attributes of the Estimate Object, the Signal Processing Task can figure out the type of processing required. If its review of the Acquisition Object shows that the data set is 2D data, for instance (from the DataType attribute), the Signal Processing Task knows to perform 2D processing. By referring to the BPFiltering attribute of the Estimate Object, the Signal Processing Task will learn the type of bandpass filtering to employ in its processing. If the Signal Processing Task sees that the DataType is Doppler data, it knows to perform Doppler processing, with the NumPRI attribute informing the Signal Processing Task of the number of lines of data to be used in the Doppler frequency estimation for each ensemble. The DoppEstType attribute of the Estimate Object guides the Signal Processing Task to compute Doppler power estimates or Doppler frequency estimates. The BufStart and BufSize attributes define the size of an estimate data set and its location in Cineloop Memory. The Flags, List, SamplePeriod, and TaskPtr attributes serve the same purposes as in the case of the Acquisition Object discussed above. The other attributes are exemplary of those that may be employed by the system designer.

Finally, the Raster Image Object defines characteristics of the image to be rendered by the Display Task. The first attribute, EstimateObject, points back to the Estimate Object for the estimate data set being rendered. The Palette attribute defines the color spectrum for color displays or the greyscale map for 2D images. The Scale attribute defines image scaling to be used, and the Orientation attribute tells the Display Task to render the image upside down or rightside up, for instance. Other attributes such as RIO_X, RIO_Y, ViewHeight, and ViewWidth, define the location of the image display window on the display screen and the size and position of the rendered image within that display window. The Raster Image Object may also employ many of the general purpose attributes of the other objects. For instance, TaskPtr would be used to repetitively point to the Display Task when a three dimensional data set is to be operated upon repeatedly in the rendering of three dimensional images.

Figure 7:
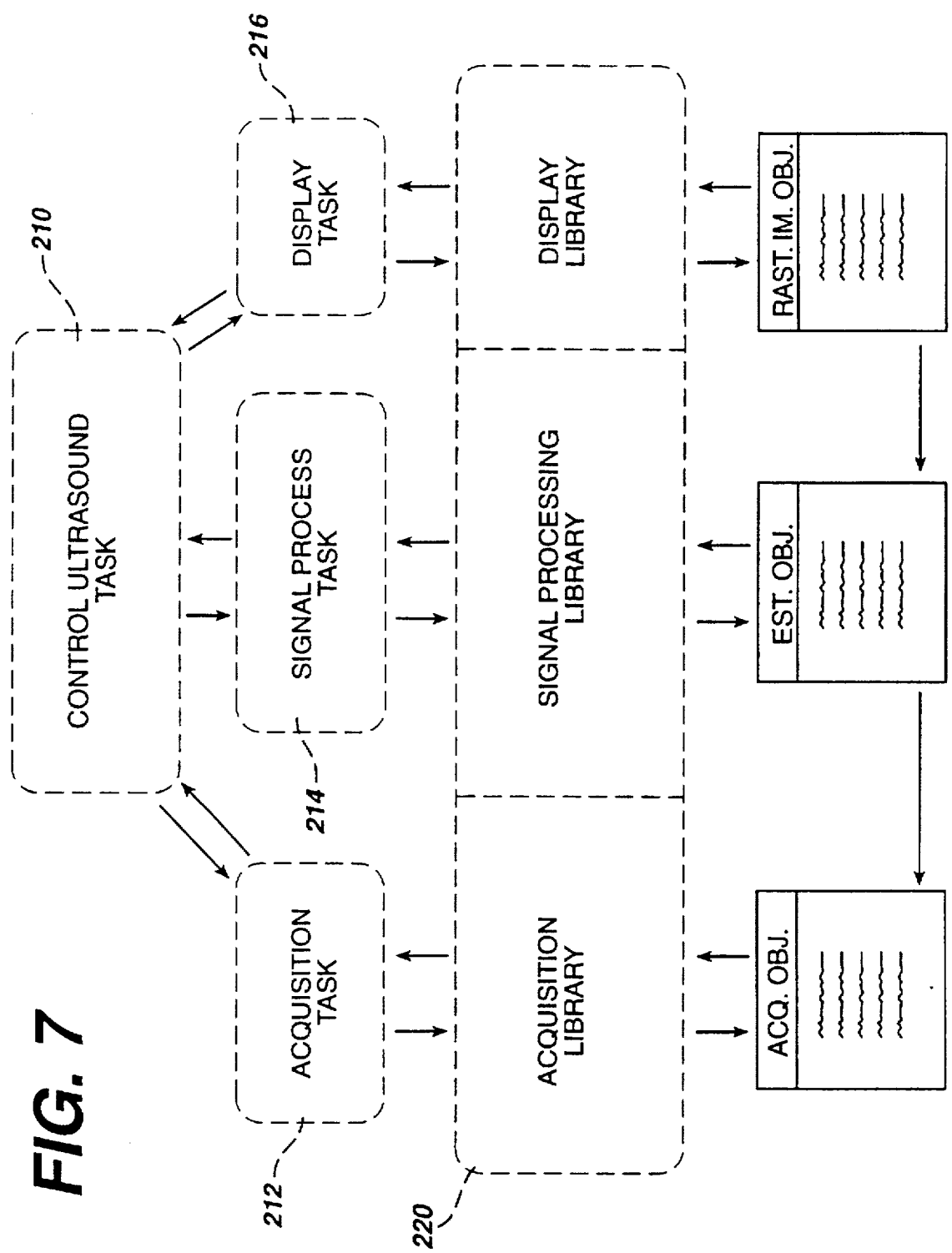
FIGS. 7 and 7a are flowcharts illustrating the operation of a preferred embodiment of the present invention during system initialization.
Figure 7A:
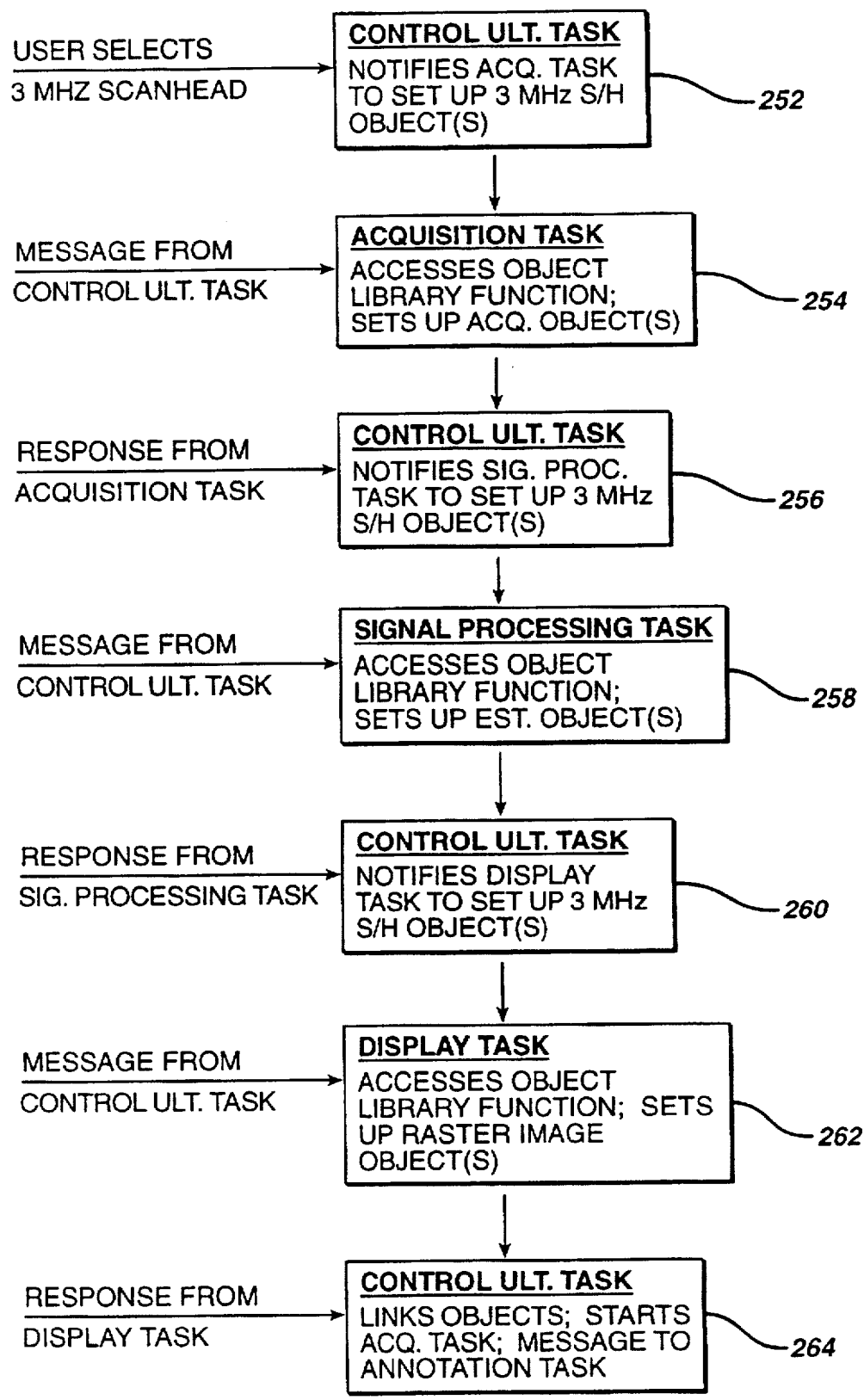

Referring to FIGS. 7 and 7a, flowcharts are shown which illustrate how the object oriented software architecture is set up to perform an ultrasonic imaging procedure. FIG. 7 illustrates the interplay of the software tasks and objects during initialization of a procedure, and FIG. 7a is a flowchart of the task sequence, with the event initiating each task located to the left of each task.

This example begins with the assumption that the ultrasound system operator wants to begin imaging with a different scanhead, a 3 MHz scanhead. The selection of the new scanhead by the operator is an event which is responded to by the scheduling and running of the Control Ultrasound Task by the multi-tasking scheduler, as shown by step 252 in FIG. 7a. The Control Ultrasound Task 210 notifies the Acquisition Task 212 to set up an Acquisition Object for data from the 3 MHz scanhead. The Acquisition Task is scheduled upon receipt of this message from the Control Ultrasound Task and accesses its object library function as shown by step 254. The ultrasound system contains a software library 220 of data objects as shown in FIG. 7, partitioned into an Acquisition Library, a Signal Processing Library, and a Display Library. The library may be stored on hard disk 102 or in system memory 84, with considerations being given to the size of the library, the availability and cost of system memory, and the desired time in which to set up a new scanning procedure. The library function of the Acquisition Task selects the Acquisition Object or Objects (as discussed below) for the 3 MHz scanhead from the Acquisition Library. A generalized Acquisition Object may be acquired from the library and modified by the library function particularly for the 3 MHz scanhead, but greater speed and simpler processing is afforded by using an Acquisition Object which has previously been prepared and stored in the library especially for the 3 MHz scanhead.

After the proper Acquisition Object has been set up, the Acquisition Task responds back to the Control Ultrasound Task with the name of the Acquisition Object and a scanhead identifier for later display. The Control Ultrasound Task reacts to this event by being scheduled and notifying the Signal Processing Task to set up an Estimate Object for the new Acquisition Object, as shown in step 256. The Signal Processing Task 214, in a similar manner, is scheduled and run to access its library function for selection of the appropriate Estimate Object from the Signal Processing Library. The library function sets up the Estimate Object as shown in step 258, linking it to the new Acquisition Object, and responds to the Control Ultrasound Task with the name of the new Estimate Object. The Control Ultrasound Task is scheduled again in reaction to this response and is run to notify the Display Task to set up a Raster Image Object for the new Estimate Object, as shown in step 260. The Display Task 216 likewise is scheduled and run as shown in step 262 to access its library function and sets up the appropriate Raster Image Object, linking it to the Estimate Object created by the Signal Processing Task. When the Raster Image Object has been set up, the Display Task sends a response of this accomplishment to the Control Ultrasound Task.

With all of the objects created and properly linked, the Control Ultrasound Task sends a message to the Annotation Task to display the identity of the 3 MHz scanhead on the system display. This notifies the operator that the selected 3 MHz scanhead is now operational and ready for scanning.

Figure 8:
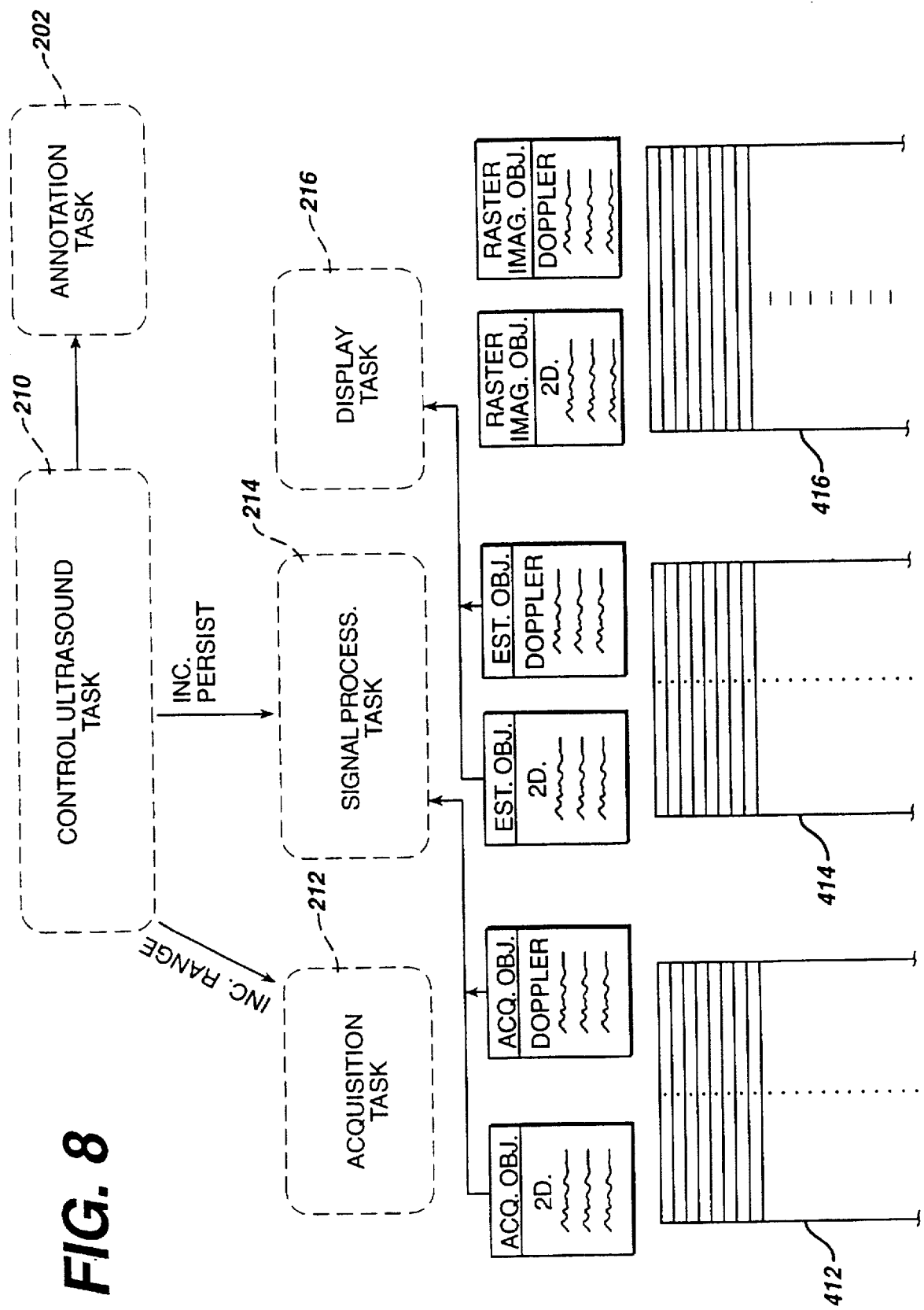
FIGS. 8 and 8a are flowcharts illustrating the operation of a preferred embodiment of the present invention during ultrasonic imaging.
Figure 8A:
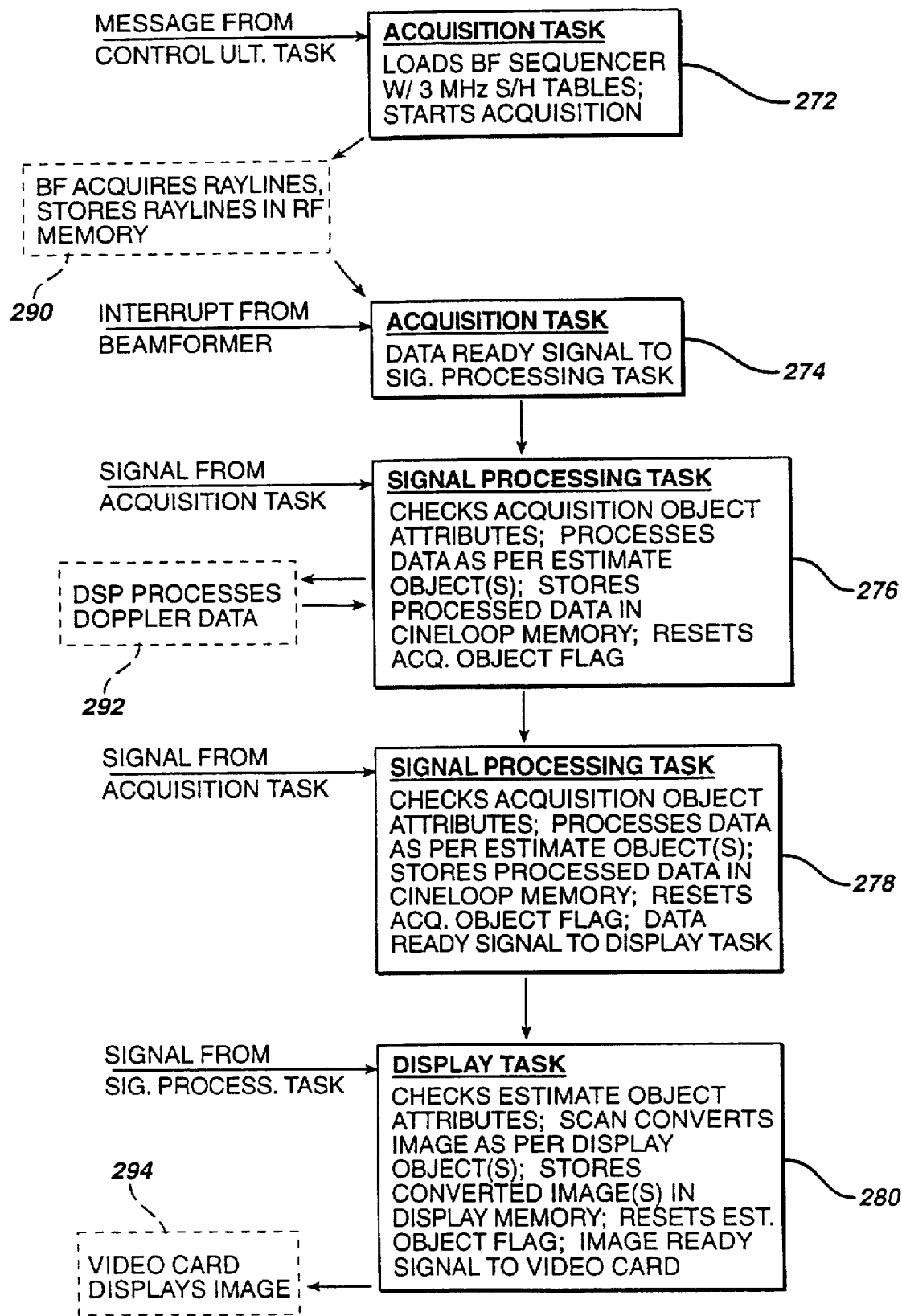

Turning now to FIGS. 8 and 8a, flowcharts are shown illustrating how the ultrasound system operates during imaging with the 3 MHz scanhead selected above. Two examples will be presented, the first of which is the performance of colorflow imaging as depicted by the screen display 300 in FIG. 9. The screen display 300 contains a 2D image 302 of a blood vessel 306 which has been acquired by a 3 MHz curved array scanhead. A color box 304 is outlined in the center of the 2D image, in which the bloodflow velocity is shown in color as indicated by the shaded area of the vessel 306. A number of alphanumeric and graphical representations are shown on the screen, including a depth scale 310, a color scale bar 312, patient name ("ID"), the date, time, and parameters of the scanning procedure such as the scanhead ID and the color PRI.

Figure 10:
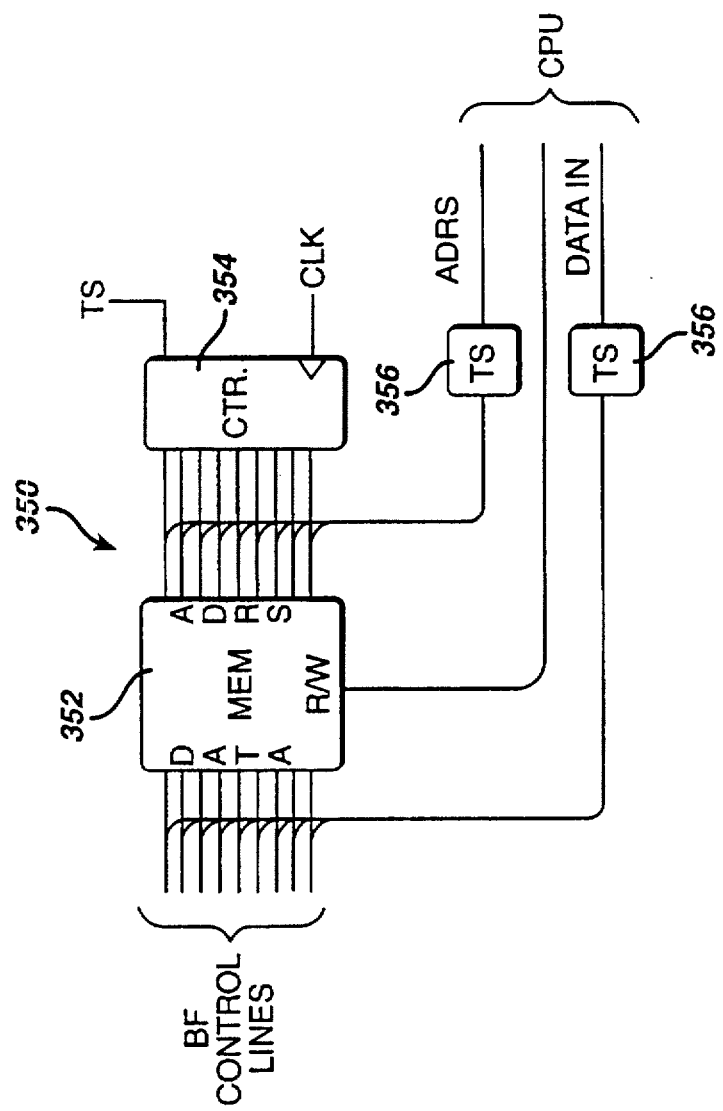
FIG. 10 illustrates in block diagram form the beamformer sequencer in a constructed embodiment of the present invention.

The ultrasonic imaging process begins in FIGS. 8 and 8a with the Acquisition Task 212 being notified by the Control Ultrasound Task 210 in step 272 to begin colorflow image acquisition. The Acquisition Task gains access to the CPU and, if it has not done so previously, loads a sequencer 350 in the beamformer controller 130 with the control sequence for acquisition of the desired ultrasonic image data. The beamformer sequencer 350, illustrated in block diagram form in FIG. 10, is a state machine which executes a sequence of operations that control the operation of the beamformer 90. In contrast to a computer or processor which performs calculations and makes processing decisions, the state machine simply executes a preordered set of instructions. The set of instructions for the beamformer controller sequentially pulses the scanhead elements to transmit ultrasonic beams, receives and samples echoes returned from beam transmission, delays and sums individual element signal samples to form focused and steered receive signals, stores the received signals in predetermined locations of the RF memory, and generates interrupts after acquisition of predetermined sets of signal data. The interrupts are preferably programmed to be generated after storage of data sets which require substantially uniform periods of signal processing to provide a smooth flow of processed data through the system. This may result in interrupts generated after each group of sixteen 2D raylines and after each pair of Doppler ensembles of ten lines per ensemble, for instance.

The desired sequence of instructions for the beamformer controller is accessed by the Acquisition Task as an instruction data table from system memory or hard disk storage and is sequentially loaded into a memory 352 of the beamformer controller. During loading a tri-state control line TS on an address counter 354 is switched to cause the counter outputs to attain their high impedance state, tri-state drivers 356 are switched to their low impedance state, a read/write control line of the memory 352 is switched to the write condition, and the instruction data is applied to the data lines of the memory 352 from a Data In bus while memory locations are addressed by means of an Adrs bus. As the Adrs bus increments to address a sequence of memory locations the instructions on the Data In bus are loaded into the addressed memory locations. After the instruction set has been loaded into the memory 352 the tri-state drivers 356 are switched to their high impedance state, the TS control line on the address counter is switched to its low impedance state, and a clock signal CLK is applied to the address counter 354 at the start of acquisition to sequence the memory 352 through the instruction sequence. The instructions are sequentially produced on the data lines of the memory and the beamformer control lines to step the beamformer through the desired sequence of operations. After the last instruction in the sequence has been executed to complete the acquisition of the raylines of a full image, the address counter resets and begins the sequence again to acquire another image. Thus, the beamformer is continuously and asynchronously operated with respect to the CPU to repetitively acquire real time ultrasound data, which is stored in the RF memory as it is received.

Figure 9:
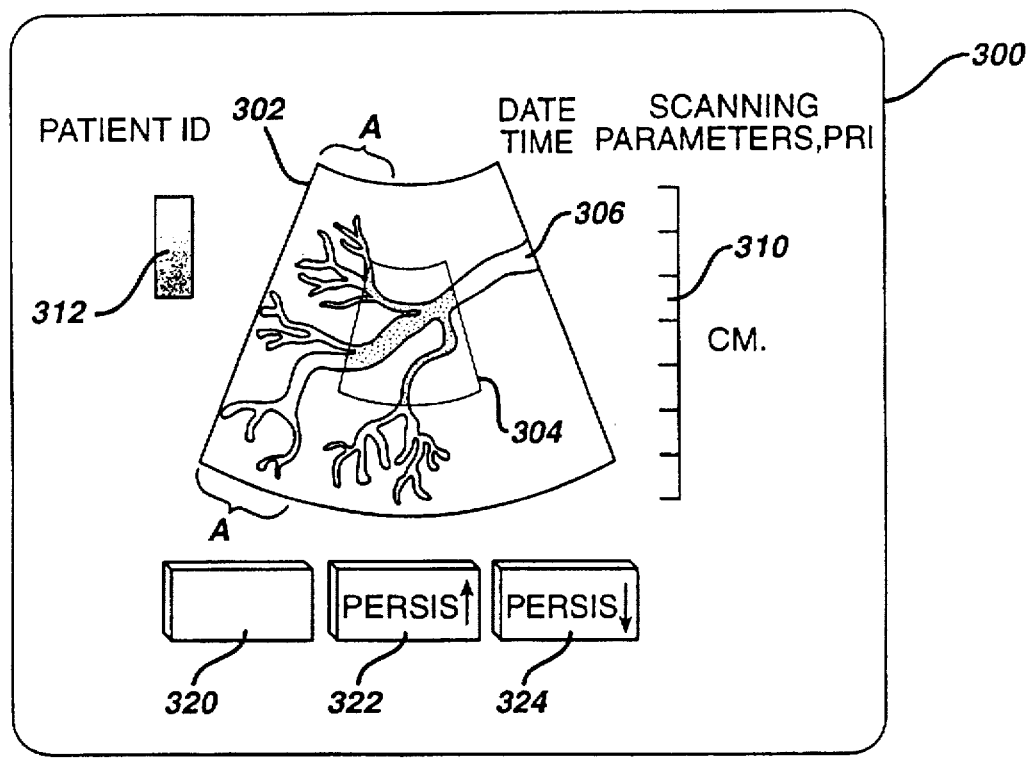

After the Acquisition Task has loaded the beamformer sequencer and started acquisition it goes to sleep while the beamformer acquires and forms rayline data and stores the data in RF memory as indicated in step 290. Referring to FIG. 9, it will be assumed that in the present example the beamformer begins scanning the image area 302 from the left by acquiring the thirty-two 2D raylines spanning the depth of the image between brackets A—A. It is further assumed that the beamformer controller has been programmed to generate an interrupt after the data of sixteen 2D raylines has been acquired. This interrupt awakens the Acquisition Task as shown by step 274 and the task is scheduled by the multi-tasking scheduler and runs on the CPU to send a "data ready" signal to the signal Processing Task. After sending this signal the Acquisition Task returns to sleep as the Signal Processing Task becomes ready, is scheduled, and gains access to the CPU in step 276.

As the beamformer continues with its scanning sequence the Signal Processing Task runs on the CPU and begins by checking the attributes of the Acquisition Object to which its Estimate Object points. Thus informed as to the characteristics of the recently produced acquisition data set, including the fact that the data set is for 2D data, the Signal Processing Task begins processing the data in accordance with the attributes of its linked Estimate Object. For 2D object data the Estimate Object might provide scaling, bandpass filtering, and amplitude detection. In the software architecture of the present invention scaling is provided by multiplying, shifting or repetitively summing signal values. Bandpass filtering is provided by an FIR filter function which through multiply and summation operations on successive data samples provides the desired filter characteristic. Amplitude detection software operates by taking the square root of squared I and Q quadrature data samples. Frame averaging is achieved by computing the average of corresponding data values in consecutive image data sets. In this manner the processing of ultrasonic image data is readily carried out in the software environment.

As the Signal Processing Task processes the acquisition data set, it stores the resulting estimate data in Cineloop Memory beginning at the starting address given by the BufStart attribute. In the present example there will be sixteen raylines of R-θ estimate data stored in Cineloop Memory when the first acquisition data set has been fully processed.

The Signal Processing Task will reset the Flags bit in the Acquisition Object as shown in step 276, indicating that its associated data set has been processed and may be written over by the beamformer. The Signal Processing Task then checks the AcqObjectLink to see if another Acquisition Object is linked to the first one. In this case there is a second Acquisition Object for the Doppler data of the image. When the Signal Processing Task consults the second Acquisition Object at this time, it finds that no Flags bit has been set and hence no new data is associated with the second Acquisition Object. With its job completed for the moment the Signal Processing Task goes back to sleep to await its next call.

The next call in this example comes when steps 274 and 276 of FIG. 8a are repeated for the data set of the next group of sixteen 2D raylines. Thereafter the beamformer begins scanning the central part of the image where, in this example, there is a colorflow box 304 which is sixty-four raylines in width. The colorflow box display is formed of both Doppler and 2D information. In a preferred embodiment the raylines which are to be Doppler processed are acquired by quadrature sampling of the returning echo information as described in my U.S. Pat. No. 5,544,655. With quadrature sampling, the received echo signals are sampled by the analog to digital converters of the digital beamformer in 90° phased increments of the reference Doppler waveform. Quadrature sampling efficiently produces digital signal samples in the desired I and Q relationship for Doppler processing and 2D amplitude detection as described above, without the need for any subsequent phase shifting or phase shift filtering, an advantage for PC based ultrasound systems with finite processing bandwidth.

The control sequence of the beamformer sequencer will now start to acquire Doppler ensembles and 2D raylines in time interleaved intervals. Doppler ensembles typically comprise eight to sixteen lines of samples along a rayline. For instance the beamformer may acquire two ensembles of ten lines apiece, then generate an interrupt to signal that the two ensembles are ready for processing. This pair of Doppler ensembles may then be followed by two 2D raylines from the same locations as the ensemble data. The beamformer may continue to produce interleaved pairs of Doppler ensembles and 2D raylines across the colorflow box until sixty-four Doppler ensembles and 2D raylines have been acquired. The beamformer in the present example will then return to 2D rayline scanning to scan the right-hand side of the image in two groups of sixteen raylines for a total of 128 raylines for the full image. In a preferred embodiment Doppler data and 2D data are stored in different partitions of the RF Memory as indicated by the partitioned RF Memory 412 in FIG. 8, and each data type is associated with its own Acquisition Object, as shown above RF Memory 412.

In a preferred embodiment the processing of 2D acquisition data is performed on the PC's CPU by the Signal Processing Task. The acquisition data is read from the RF Memory, processed, and the resulting estimate data is stored in Cineloop Memory. Like the acquisition data, estimate data is stored in different partitions of the Cineloop Memory 414 as shown in FIG. 8, one for 2D estimate data and another for the Doppler estimate data of the image, and each data set is associated with its own Estimate Object. Doppler signal processing is performed on the DSP Card 92 in the illustrated embodiment. When the Signal Processing Task sees that the data ready for processing is Doppler ensemble data, it conditions the DSP Card for the desired processing, transfers the Doppler acquisition data set to the DSP Memory, then commands the DSP Card to begin processing the data. When the DSP Card is finished processing the data it returns Doppler estimate data to the DSP Memory, notifies the Signal Processing Task of its completion by interrupt, and the Signal Processing Task responds by storing the Doppler estimate data in a Doppler partition of the Cineloop Memory. In a preferred embodiment the Signal Processing Task checks the Flags bits of the Doppler Acquisition Object before checking the 2D Acquisition Object. In this way the Signal Processing Task can consign ready Doppler data to the DSP Card where its processing can take place while the Signal Processing Task acquires and processes ready 2D data on the PC's CPU. If the DSP Card completes its Doppler signal processing before the Signal Processing Task has completed its 2D signal processing the interrupt from the DSP Card will interrupt the Task's 2D processing to store the Doppler estimate data in the proper locations of Cineloop Memory.

The continuous acquisition of ultrasound data by the beamformer and its processing by the Signal Processing Task will continue for an image until the final Signal Processing Task for the frame is executed as shown by step 278. This step is the same as that of step 276, except that the task concludes with the sending of an estimate data ready signal to the Display Task. The Display Task is now scheduled by the multi-tasking scheduler and run on the CPU.

The Display Task begins by checking the attributes of the Estimate Object. After it checks those of the 2D Estimate Object, it notes the link to a second Estimate Object and checks the attributes of the Doppler Estimate Object. From these characteristics, and the characteristics of the Raster Image Objects to which they are linked, the Display Task determines the type of image rendering to perform. While the two types of estimate data may be rendered into separate 2D and color Doppler images in different partitions of Display Memory, in the present example the 2D and Doppler estimate data sets are rendered together in Display Memory area 416 to form a colorflow image.

The Display Task renders a 2D image by scan converting the 2D estimate data into raster data. Scan conversion may be done either computationally or by lookup tables and further includes scaling of the data which performs the desired greyscale or color mapping function. Scan conversion generally includes the calculation of computed data values between the received samples or may comprise the calculation of an entirely computed set of raster data. In either case an n by m conversion grid is formed for each estimate data value, depending from an estimate data point at the upper left-hand corner of the grid. The n by m grid may be a four by four grid, for instance. Each square of the grid contains a conversion factor which is used to compute a raster data value for that square, when applied to the value of the depended estimate data value and neighboring values. The conversion factor includes a scaling factor for the desired greyscale mapping of the computed values. The grid and its conversion factors are replicated for each estimate data value, permitting the calculation of up to sixteen computed values (with a 4 by 4 grid) for every estimate data value. The computed values used are those corresponding to the positions in the desired raster data array. When the Display Task is finished computing a greyscale raster data array from all of the 2D estimate data values, it resets the Flags bit in the 2D Estimate Object to allow the estimate data to be overwritten with new data, and checks the EstimateObject attribute for any linked data sets.

In this example the Display Task is pointed to a second Estimate Object of Doppler estimate data. The Display Task then renders the colorflow information in the same image area using the same rendering procedure as used for the 2D data, but with a scaling factor used for the desired color mapping. The Display Task may also, if desired, employ a different grid depending upon the size of the sample volume size of the colorflow data. For instance a two by two grid may be used for a large sample volume size.

As the Display Task renders the color image it selectively replaces 2D values in the previously formed 2D raster data array. Color rendering is only done over the area of the colorflow box 304, the location and dimensions of which are specified by the attributes for the Doppler Raster Image Object. If the Display Task finds a zero value or a value below a predetermined threshold in the 2D raster data array, it looks to see if a valid Doppler value has been produced for that location. If so, the Display Task overwrites the 2D value in that location with the Doppler raster data value. The Display Task proceeds in this manner to fill in the colorflow box area of the raster data array with colorflow raster data values.

When the Display Task has finished rendering the Doppler estimate data into the raster data array it resets the Flags bit of the Doppler Estimate Object to signal the release of the area of Cineloop Memory in which the Doppler estimate data was stored. The completed raster data array is now ready for display by the Video Card 94. The Display Task signals the Video Card that the new image is ready, as shown at the end of step 280. The Video Card at this time is displaying an image of raster data which was previously rendered in another area of the Display Memory. When the Video Card completes display of the last raster line of this previous image, it acknowledges the new raster data and switches to display raster lines from the newly completed image, as shown at 294. The Display Memory area occupied by the raster data of the previous image is now available for the rendering of another new image by the Display Task. Since the Display Memory is dual port memory, the Video Card can continuously read out raster data from one image at the desired video display rate while the Display Task renders a new image in another area of the same memory.

While this image acquisition, processing, and display rendering was taking place, the Annotation Task was forming a screen overlay with the alphanumeric and graphic information of the image, including the PATIENT ID, DATE, TIME, SCANNING PARAMETERS, PRF, color bar 312, and depth scale 310 as shown in FIG. 9. The screen overlay is combined with the ultrasound image by the Video Card and the completed image is transmitted to or displayed on the desired medium (e.g., monitor, VCR, network, printer, etc.).

As the Display Task is rendering one image, the beamformer 90 continues to acquire acquisition data and store it in RF Memory, and the Signal Processing Task continues to process the acquired data and store estimate data in Cineloop Memory. These periodic tasks are accommodated by the multi-tasking scheduler, which schedules the Acquisition and Signal Processing Tasks to run on the CPU as they become ready. Thus, quantums of Display Task utilization of the CPU are periodically interrupted for quantums of CPU time assigned to the other two tasks and the Annotation Task. When the Display Task has finished rendering one image, estimate data sets are generally ready to be rendered as another new image. The CPU is thus continually producing a sequence of real time ultrasonic images.

Continuing with the first example, the control panel 62 of a constructed embodiment of the present invention includes a number of paddle switches which are used by the system operator to change scanning parameters. When the operator pushes a paddle switch one way, the corresponding parameter is varied in one sense, and when the paddle switch is pushed the other way the parameter is varied in the opposite sense. One of these paddle switches is used to vary the depth (range) of an image. As this switch is pushed one way the range is decreased by a predetermined increment, and when it is pushed the other way the range is increased by that increment. The operator can preset the increment to a desired value, such as 1 cm, 2 cm, 5 cm, or some other value. The constructed embodiment makes use of such increment/ decrement controls to the fullest extent possible for, as discussed below, it provides an efficiency in CPU utilization over other techniques, and single point control of system attributes by objects that own these attributes.

Suppose that the operator is scanning with the system and desires to change the range of the image to a deeper depth. The operator does this by pushing the range paddle switch in the "increment" direction. Immediately the image on the display screen changes. The image itself is of the same size, but the image is of a deeper area which extends further into the body, since the depth of the image has increased. The range scale 310 changes, indicating the new depth to which the image extends. The ultrasound system causes this to happen with the following sequence.

The Control Ultrasound Task 210 responds to an interrupt from the control panel 62, is scheduled and gains access to the CPU, and sees that a request has been made to increase the scanning range. The Control Ultrasound Task sends a message to the Acquisition Task, "increase range," as shown in FIG. 8.

The Acquisition Task receives the message, is scheduled and gains access to the CPU, and first checks to see if the range can be increased. If it cannot, because the scanhead is already scanning at its maximum range, it sends the message "failed" back to the Control Ultrasound Task. The Control Ultrasound Task can then do nothing, leaving the system to run at its maximum range, or can send a message to the Annotation Task to put a message on the screen that the range is already at its maximum. But if the Acquisition Task sees that the range can be increased, it accesses the library function to change the necessary attribute(s) of the Acquisition Object(s). The library function may have to change attributes controlling transmit intervals (PRI) if transmit and receive periods are too closely spaced to permit a greater range. If time is available for reception of echoes from the increased depth, only receive attributes may have to be changed, such as NumSamples, the number of samples taken along a rayline, which will increase as echo samples are acquired to a greater depth. When the appropriate changes have been made to the Acquisition Object(s), the Acquisition Task implements the new objects by loading a new command sequence into the beamformer sequencer 350. In a preferred embodiment the beamformer sequencer is double buffered, enabling a new command sequence to be transmitted to the beamformer controller while the beamformer continues to be controlled by its current sequence.

After the Acquisition Objects have been modified, the Acquisition Task sends the new range to the Control Ultrasound Task and sets a flag in the Acquisition Object to indicate that the Object has been modified. The next time the Signal Processing Task is scheduled and gains access to the CPU, it sees the flag indicating that the Acquisition Object has been changed and makes appropriate adjustments to attributes of its Estimate Objects. The Signal Processing Task will see that there will be more samples along each rayline, for instance, and will increase the value of the MmPerCol attribute. The Signal Processing Task then sets a flag in the Estimate Object indicating that the object has been modified, and returns any attributes that other tasks need to know to the Control Ultrasound Task.

The next time the Display Task is scheduled and gains access to the CPU, it likewise sees the modified flag in the Estimate Object and makes appropriate changes to attributes of its Raster Image Object(s). The Display Task will see, for instance, that it has to render an image of greater depth over the same display area, and will increase the value of the MmPerPixel attribute. When the image is rendered, the Display Task returns the new MmPerPixel and other modified attributes to the Control Ultrasound Task.

The Control Ultrasound Task is scheduled and gains access to the CPU, and sees that all of the necessary object changes have been completed. A message is sent to the Annotation Task to modify the graphic overlay screen with a new depth scale 310 for the increased depth parameter. The steps of FIG. 8a are now begun with the new data objects. After transmission of the new beamformer control sequence to the buffer of the beamformer controller is complete, the beamformer controller 350 immediately switches to the new command sequence and begins acquiring and storing RF data in accordance with the new sequence. Any partially completed acquisition data sets are abandoned, and their RF Memory area is available for overwriting by new data sets. The modified objects come into use as corresponding data sets are developed, in time resulting in the rendering of a raster data array of a first image with the new depth. The change over to the new image occurs at the completion of display of an old image by the Video Card, as described above.

FIG. 9 illustrates the display of three "softkeys" 320, 322, and 324 below the ultrasound image 302. The softkeys are displayed by the Annotation Task and physically line up with a row of hardkeys located below the display screen on the control panel 62. In the drawing the second and third softkeys 322 and 324 are labeled "Persist↑" and "Persist↓" and enable the operator to increase a display characteristic known as persistence. As described in U.S. Pat. No. 5,215, 094, the persistence parameter enables rapidly occurring changes in flow to be sustained in a real time display so that they may be more readily discerned by the clinician. In a constructed embodiment of the present invention a change in image persistence is effected by pressing a hardkey below the appropriate softkey. Depressing hardkey 322' on the control panel 62 (see FIG. 5) causes softkey 322 to flash and the persistence characteristic of the image to increase. Since this change may be implemented solely by the Signal Processing Task, the Control Ultrasound Task responds to the hardkey by being scheduled and gaining access to the CPU and sending the message "increase persistence" to the Signal Processing Task as shown in FIG. 8. The Signal Processing Task responds by increasing the persistence attribute of its Doppler Estimate Object and sending the new persistence level back to the Control Ultrasound Task (or "failed" if persistence is already at its maximum level). The Signal Processing Task will then process the next acquisition data set in accordance with the new persistence setting. The Acquisition Objects and the Raster Image Objects are unaware of the change and have no reason to know about it. They will continue to acquire data and render it as before, unmindful of the change in signal processing.

In the constructed embodiment it was decided to display persistence on the screen as a quantified scanning parameter. This increases the complexity of the message exchange, for the quantified value must be stored as an Estimate Object attribute, the value returned to the Control Ultrasound Task, and sent to the Annotation Task for change of the screen display of scanning parameters. This approach has the advantage of keeping one owner for the value of persistence, in this embodiment, the Estimate Object. The Control Ultrasound task has no need to know the present value or the limits of persistence, since this information is kept in the objects attribute and method. Hence the constructed embodiment evidences the philosophy of using the increment/decrement approach to changing scanning and system parameters to a very significant extent, so that values and limits can be managed by the objects that own the attribute being changed.

Figure 11:
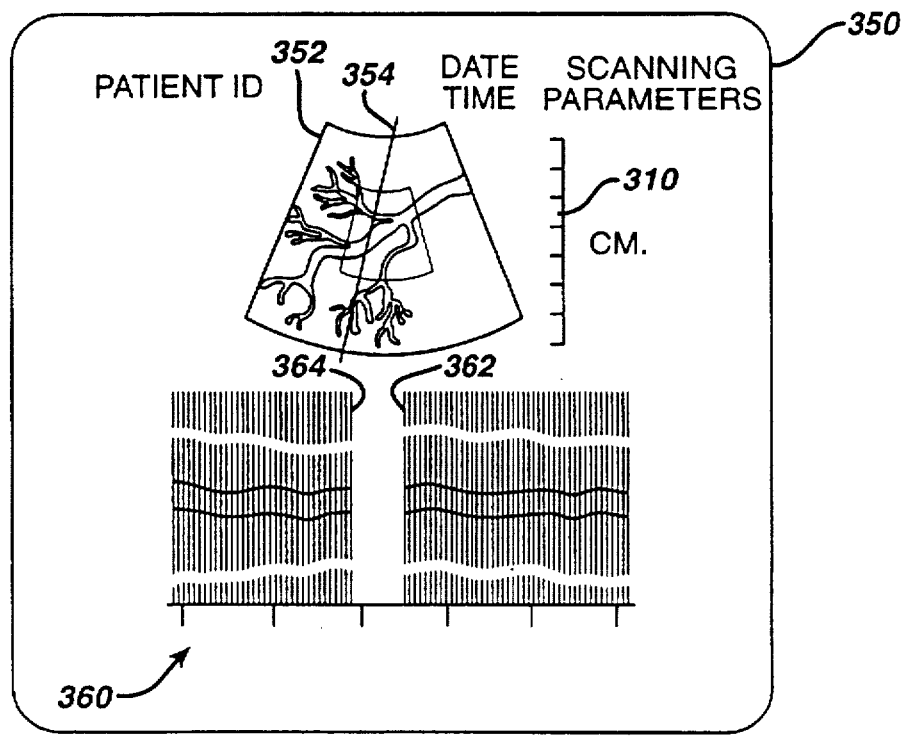

A second example of the operation of an embodiment of the present invention is shown by the display 350 of FIG. 11. This is an M-mode display, with a real time 2D image 352 shown above a sweeping display 360 of M-lines. The M-lines of the sweeping display are acquired over time from along a cursor 354 which is located on the 2D image by the operator. The M-mode display is created by following the same processing sequences illustrated in FIGS. 7, 7a, 8 and 8a for the previous example.

System setup (FIGS. 7 and 7a) proceeds as before. A 2D Acquisition Object is set up for the 2D image, as was done in the previous example. The 2D Acquisition Object is linked this time to an M-mode Acquisition Object. The M-mode Acquisition Object will have attributes defining characteristics such as the time intervals at which raylines for M-mode are acquired and the number of acquired raylines which are averaged together to form one M-line for display. Similarly, there will be two Estimate Objects, one for the 2D acquisition data and another for the M-mode acquisition data, and there will be two Raster Image Objects, one to render 2D images in an upper display area and another to render the M-mode display in a lower display area.

Execution of the object data proceeds as described in FIGS. 8 and 8a, except that Doppler objects are replaced with M-mode objects. The beamformer will be programmed to acquire M-lines time interleaved with 2D lines, the intervals determined by considerations of the display sweep rate and the number of acquired lines which are averaged to form one display M-line in real time. As before the two acquisition data sets will be stored as separate data sets in RF Memory. Since the M-mode data set is in essence temporal 2D data, the Signal Processing Task will process the M-mode acquisition data on the CPU rather than with the DSP Card, although the latter is an available alternative if it is desired to simultaneously process 2D and M-mode data. Two estimate data sets will be stored in Cineloop Memory, and will be separately rendered by the Display Task.

It is possible to render the M-mode data as a scrolling display, in which the lines appear to march from right to left across the screen and new M-lines are continually added to the right side of the display as older lines drop off at the left. However the present inventor has employed a sweeping display for its processing advantages in the personal computer environment. In the example of M-mode display 360, M-line 362 was displayed first, and remains stationary on the screen as new M-lines are displayed sequentially to its right. When the M-lines fill to the right side of the display, succeeding M-lines begin to appear at the left and continue to fill the display to the right, eventually reaching a point as shown in FIG. 11, where the oldest M-line is line 362 and the newest is line 364. As new M-lines are added they appear to the right of M-line 364, eventually reaching M-line 362 and then overwriting the older M-lines.

An advantage of the sweeping display is that the M-lines do not appear in different screen locations over time as in a scrolling display, and are stationary in the image. The ramification of this is that the rendering of a new M-mode line can be performed by simply rendering in the new M-line over the oldest M-line on the display. This is appreciably faster than re-rendering all of the M-lines and, significantly for the PC-based ultrasound system, requires far less rendering time and hence CPU utilization by the Display Task. When the scanning is stopped, the entire M-mode display can be rewritten to right justify the newest M-line, thus eliminating any discontinuity in a stored or printed display.

In a constructed embodiment of the present invention the multi-tasking processing and object oriented design approaches allow software designers and programmers considerable latitude in designing and implementing software changes. Since the multi-tasking scheduler causes software to be executed and time interleaved in discrete time slices, each software task can be modified or augmented by new processing capabilities with little regard to the execution time of the task. This is because the multi-tasking scheduler will maintain real time system performance by time interleaving different tasks in response to the occurrence of real time events. The lengthening of the task can mean that more quantums of time will be required to complete the task, but the change will not debilitate or crash the system, as it would if a task were restricted to a fixed maximum time window in which to complete its function. In an embodiment of the present invention the multi-tasking scheduler simply adapts to a lengthened task by scheduling more quantums for completion of the task, and the system continues to run. The lengthening of a task by a few or even an appreciable number of CPU quantums can slow the overall system, but to a degree that is generally unnoticeable to the operator.

This adaptive benefit of multi-tasking allows software designers to operate with a considerable degree of independence. The Acquisition Task designers, for instance, need not constantly consult with the Signal Processing Task designers as to the changes they are making and whether the designs of the two groups will work together. This freedom is further enhanced by the object oriented design approach, where neither group is appreciably restricted by limitations imposed by the other. Each group knows what it will be working with, a data set with a data object, and the message that "data is ready," and nothing further. Each group has great latitude in deciding how it wants to respond to the data set it receives, and how it wants to process them. Since object oriented design tasks and objects are by nature encapsulated, each group is free to employ the resources at its command to process a data set, and knows it is immune from external imposition on its resources and operations by other tasks. The event-driven multi-tasking environment and the data-driven object oriented environment combine to provide more efficient and higher quality operation and performance.

Resources are not without limit in any environment, however, and the finite resource which should be used carefully in the personal computer ultrasound system is the CPU's processing power. The present inventor monitors the use of this processing power, referred to as the PC's "bandwidth." In particular, the bandwidth utilized by the various tasks during imaging is monitored to gage performance factors such as data acquisition rate and display frame rate. The present inventor has found in his constructed embodiment that the Display Task uses 70%–80% of the available bandwidth on an ongoing basis, the Signal Processing Task about 15%, and all other tasks the remainder. The Acquisition Task, when not programming the beamformer or responding to control changes, utilizes a fractional percentage of the bandwidth, since its usual function is simply to notify the Signal Processing Task that acquisition data is ready.

Since the system bandwidth is a finite resource, the present inventor makes choices of priorities in the constructed embodiment when bandwidth utilization become strained. When only two dimensional imaging is being performed, all tasks in the system are assigned a priority of zero except for the Signal Processing Task, which has a priority of +10. This means that a list of ready tasks awaiting CPU access will be interrupted when a Signal Processing Task is ready to process a new acquisition data set. This higher priority for Signal Processing insures that every group of raylines will be processed and no rayline data will be missed. When the system is performing simultaneous two dimensional imaging and M-mode display, the priority of the Display Task for M-mode is set at zero and the priority of the Display Task for 2D is set at −2. This insures that 2D scan conversion will be interrupted to process each new M-mode line as its data is produced, since the scrolling M-mode lines have to be produced in real time. Similar prioritization occurs for a scrolling spectral Doppler display.

The use of a higher priority for the Signal Processing Task insures that all acquired data will be processed and stored in Cineloop Memory. It does not insure, however, that every stored estimate data set will be displayed as an image by the Display Task. As the Signal Processing Task becomes more complex and sophisticated, its bandwidth demand will lessen the bandwidth that is available for the Display Task, resulting in lower display frame rates and the creation of estimate data sets which are skipped by the Display Task.

This eventuality is accounted for in the constructed embodiment by the use of the Cineloop Memory for estimate data storage. When the Signal Processing Task creates a new estimate data set for display, it changes a pointer in the system to designate the new data set as the most current estimate data set. When the Display Task finishes the display of an estimate data set, it turns to the most current estimate data set as the next to be displayed. Any estimate data set developed in the interim is left undisplayed, as the Display Task is focused on the display of the most current data. This could result, for example, in the storage of estimate data in Cineloop Memory at a 60 frames per second acquisition rate, but a display of only half of these frames at a 30 frames per second display rate.

The undisplayed estimate data set is not lost, however, but remains in sequence in the Cineloop Memory until it is eventually overwritten many frames later. Thus, the Cineloop Memory maintains an image sequence file of all displayed and undisplayed R-θ estimate data sets over the full length of the Cineloop Memory. This allows the operator to stop real time display whenever a diagnostic situation arises which requires analysis of high frame rate data. If the operator is observing a fetal heart, for instance, and would like a more detailed presentation of its rapid heartbeat, the operator can freeze the real time display and replay the R-θ frames from Cineloop Memory, which will be replayed and displayed in the slower motion display frame rate of the Display Task. In real time freeze the frame rate of display will in fact increase, as the Acquisition Task and the Signal Processing Task are no longer being called upon to acquire and process new data. Instead, the Display Task will have exclusive access to the CPU, enabling the highest system frame rate. All of the frames stored in Cineloop Memory, including those which were undisplayed in real time, can be replayed at the higher display frame rate or in slow motion, permitting the clinician to observe the fine detail of the rapid beating of the fetal heart from images acquired at the 60 frames per second rate. Captured as it is in the Cineloop Memory, the image sequence can be replayed repetitively at different speeds to enable the clinician to make a definitive diagnosis.

Figure 12:
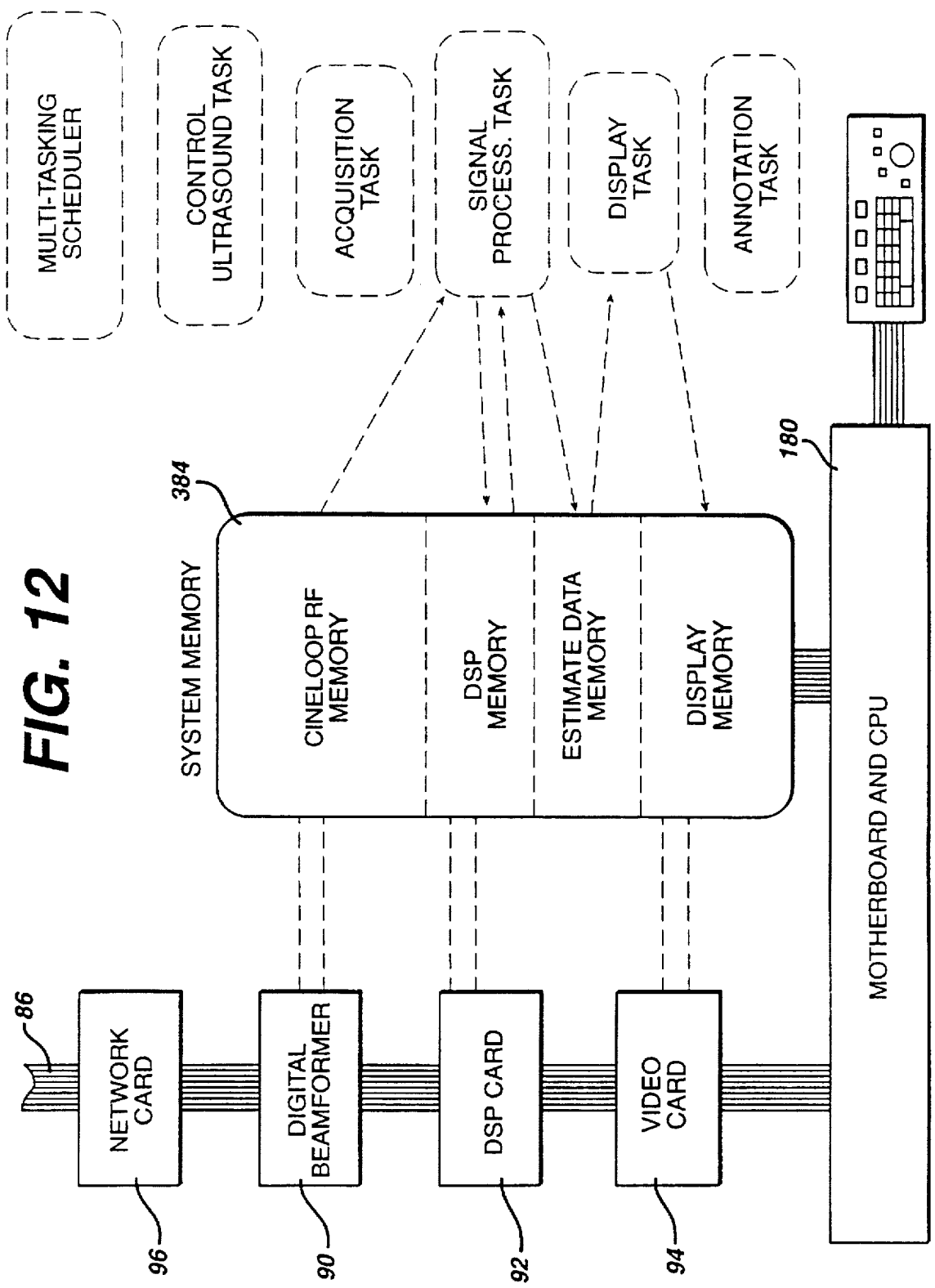
FIG. 12 is a block diagram of both the hardware configuration and software architecture of a second embodiment of a personal computer ultrasound system of the present invention.

A second embodiment of the present invention, shown in FIG. 12, further improves the diagnostic capability of the personal computer based ultrasound system. In contrast with the embodiment of FIG. 5, the embodiment of FIG. 12 organizes the system memory 384 so that the RF Memory is a dual port Cineloop RF Memory, capable of storing in sequence many sets of acquired RF data. The memory in which the Signal Processing Task stores estimate data sets, the Estimate Data Memory, is correspondingly smaller with the capacity of a limited number of frames of estimate data. This embodiment will operate in the same manner as that of FIG. 5, but with a marked difference in the case of difficult diagnostic situations. In the fetal heart example just discussed, freezing the real time image will allow the image data stored in Cineloop RF Memory to be replayed with the display of every image in the sequence. The frame rate of display will not be as high as that of the previous example, because the data stored in Cineloop RF Memory is unprocessed data; the Display Task will be sharing the CPU with the Signal Processing Task as the two tasks alternately process and display the Cineloop RF image data, a situation which is improved by using the DSP Card for signal processing and the CPU for display processing. But as before, the clinician will be able to review image data acquired at the 60 frames per second rate, since every data set in the Cineloop RF Memory will be processed and displayed.

A new advantage is present in the second embodiment, which stems from the fact that the RF data sets stored in Cineloop RF Memory are unprocessed. This enables the clinician to freeze real time imaging and replay the stored data again and again, each time with different processing techniques. If the clinician thought she spotted a momentary change in bloodflow turbulence in the colorflow images of the fetal heart in real time, for instance, she can freeze the real time display and replay the image data stored in Cineloop RF Memory, but this time with a persistence setting that might better reveal the turbulent condition. If the chosen persistence setting is unavailing, the clinician can replay the image data again, but with a different persistence setting. The clinician is also able to replay the image sequence with entirely different processing. For instance she can replay the image sequence, not with colorflow imaging, but with Power Motion Image™ processing as described in U.S. patent [appl. Ser. No. 08/655,391] to accentuate subtle changes in tissue motion in the fetal heart. Alternatively, the data sets can be replayed, not as greyscale or Doppler images, but as maps of parameters developed through tissue characterization processing. The Cineloop RF data sets can even be stored on disk, VCR, or over a network to be replayed weeks or months later by a processing technique available to the clinician at some future date.

But perhaps the most striking benefit of the personal computer based ultrasound system architecture is the confidence that any of today's performance tradeoffs are only temporary, for the technology is riding the wave of PC chip evolution. Ultrasound system designers have a natural desire to get the highest performance out of the tools given them. Given a personal computer based ultrasound system using a CPU such as a 100 MHz Pentium chip, it is a given that system designers will not hold bandwidth in reserve for future developments, but will utilize the full bandwidth of the processor at once for maximum performance. As the system evolves and the software tasks become more demanding of system bandwidth and performance slows, a ready solution is at hand which will improve virtually every function of the system: unplug the 100 MHz chip and replace it with a 200 MHz chip. Suddenly the performance of everything has improved, frame rates have quickened dramatically, and there is bandwidth to spare. Even more enhancements may now be designed and implemented, with the designers secure in the knowledge that yet another step up in PC chip performance will provide even more bandwidth in the future.

The constructed embodiment is optimally designed to take advantage of these advances in computer chip evolution. The CPU is mounted in a socket on a daughterboard, which in turn is mounted to connections in the motherboard. In the near term it is anticipated that performance will be upgraded by replacing the CPU chip on the daughterboard. Should this no longer prove to be practical, the daughterboard can be replaced by a new daughterboard and higher performing CPU. And of course it is always true that the entire PC platform—motherboard, daughterboard, CPU and operating system—can be discarded, the operating software ported to a new platform, and the new motherboard connected to the expansion bus card 120 to take advantage of the latest advances in personal computer technology.

As the bandwidth of commercially available PC and workstation CPU chips steadily increases, certain evolutions of the embodiment of FIG. 3 will surely occur. The DSP Card 92 will disappear as both Doppler and 2D signal processing are performed by the CPU. The beamformer will gradually disappear also as its digital functions are assumed by software running on a DSP card and eventually the motherboard itself. In time, the only vestige of the traditional beamformer will be the high voltage drivers and the receiver components up through the analog to digital converters. In short, the ultrasound system will employ digital functions to the greatest possible extent, all of which will be performed in software on the PC.

What is claimed is:

1. An ultrasonic diagnostic imaging system comprising:
   a beamformer to which ultrasonic probes may be removably connected for acquiring ultrasonic echo signals and producing digital rayline signals;
   a central processing unit (CPU) coupled to said beamformer for both signal processing and display processing of said digital rayline signals; and
   a display coupled to receive processed rayline signals for display of an ultrasonic image.

2. The ultrasonic diagnostic imaging system of claim 1, wherein said signal processing includes two dimensional (2D) or Doppler ultrasonic image signal processing and said display processing includes scan conversion,
   wherein said signal processing and said display processing are both performed by software under control of said CPU.

3. The ultrasonic diagnostic imaging system of claim 2, wherein said 2D ultrasonic image signal processing includes the functions of filtering and amplitude detection, and wherein said Doppler ultrasonic image signal processing includes the function of Doppler signal estimation.

4. An ultrasonic diagnostic imaging system with a personal computer architecture comprising:
   a beamformer to which ultrasonic probes may be removably connected for acquiring ultrasonic echo signals and producing digital rayline signals;

a personal computer platform coupled to receive said digital rayline signals and including a central processing unit (CPU) for executing software which signal processes and display processes said digital rayline signals for display; and a display coupled to receive processed rayline signals for display of an ultrasonic image.

5. The ultrasonic diagnostic imaging system of claim 4, wherein said software performs two dimensional (2D) or Doppler ultrasonic signal processing.

6. The ultrasonic diagnostic imaging system of claim 5, wherein said 2D ultrasonic image signal processing software performs the functions of filtering and amplitude detection, and wherein said Doppler ultrasonic image signal processing software performs the function of Doppler signal estimation.

7. The ultrasonic diagnostic imaging system of claim 4, wherein said display processing software performs scan conversion.

8. An ultrasonic diagnostic imaging system comprising:
an ultrasonic array probe;
a personal computer platform having a central processing unit (CPU) and including:
beamformer means, coupled to said central processing unit for producing digital rayline signals in response to echo signals received by said ultrasonic array probe;
signal processing software for performing two dimensional (2D) or Doppler processing of said digital rayline signals;
display processing software for performing display processing of said digital rayline signals; and
means for producing raster display signals; and
a display coupled to said personal computer platform to receive raster display signals for display of an ultrasonic image.

9. The ultrasonic diagnostic imaging system of claim 8, wherein said personal computer platform includes a motherboard including said CPU and digital memory.

10. The ultrasonic diagnostic imaging system of claim 8, wherein said personal computer platform includes an expansion bus, and wherein said beamformer means is coupled to said expansion bus.

11. The ultrasonic diagnostic imaging system of claim 8, wherein said signal processing software and said display processing software are executed by said CPU.

12. The ultrasonic diagnostic imaging system of claim 8, wherein said personal computer platform includes an expansion bus, and wherein said signal processing software is executed on a digital signal processing expansion card coupled to said expansion bus.

13. The ultrasonic diagnostic imaging system of claim 8, wherein said personal computer platform includes an expansion bus, and wherein said means for producing raster display signals includes a video expansion card coupled to said expansion bus.

14. An ultrasonic diagnostic imaging system comprising:
an ultrasonic array probe;
a personal computer platform having a central processing unit (CPU) and an expansion bus coupled to said CPU and including:
beamformer means, coupled to said expansion bus, for producing digital rayline signals in response to echo signals received by said ultrasonic array probe; and
software, executed under control of said CPU, for performing signal processing and display processing of said digital rayline signals; and a display coupled to said personal computer platform and responsive to processed digital rayline signals for display of an ultrasonic image.

15. The ultrasonic diagnostic imaging system of claim 14, further comprising a digital memory for storing said digital rayline signals, wherein said software accesses said digital rayline signals for processing under control of said CPU.

16. The ultrasonic diagnostic imaging system of claim 15, wherein said software comprises means for accessing digital rayline signals from memory, performing signal processing of said digital rayline signals, and storing processed digital rayline signals in memory.

17. The ultrasonic diagnostic imaging system of claim 16, wherein said signal processing software comprises two dimensional (2D) ultrasonic signal processing software or ultrasonic Doppler signal processing software.

18. The ultrasonic diagnostic imaging system of claim 16, wherein said display processing software comprises means for accessing said digital rayline signals from memory, performing scan conversion of said digital rayline signals, and storing scan converted digital rayline signals in memory, wherein said display is responsive to said scan converted digital rayline signals for display of an ultrasonic image.

19. The ultrasonic diagnostic imaging system of claim 16, further comprising a digital signal processing expansion card coupled to said expansion bus, and
wherein said software further comprises means for performing signal processing of said digital rayline signals on said digital signal processing expansion card.

20. An ultrasonic diagnostic imaging system with a personal computer based architecture which produces ultrasonic diagnostic images at a maximum frame rate of display, comprising:
an ultrasonic imaging probe;
a personal computer platform, connectable to said ultrasonic imaging probe, and including:
memory means for storing ultrasonic diagnostic image signal processing software; and
a replaceable central processing unit (CPU) having a given processing power which executes software for ultrasonic diagnostic image signal processing; and
a display coupled to said personal computer platform for displaying ultrasonic diagnostic images at said maximum frame rate of display,
wherein said maximum frame rate of display is changed by replacing said CPU with a CPU of a different processing power.

21. The ultrasonic diagnostic imaging system of claim 20, wherein said software comprises means for performing two dimensional (2D) ultrasonic signal processing or ultrasonic Doppler signal processing, and means for performing scan conversion.

22. An ultrasonic diagnostic imaging system, comprising:
an ultrasonic imaging probe;
an ultrasonic image signal processor, connectable to said ultrasonic imaging probe, and including:
memory means for storing object oriented ultrasonic diagnostic image processing software; and
a central processing unit (CPU) which executes said object oriented ultrasonic diagnostic image processing software; and
a display coupled to said ultrasonic image signal processor for displaying ultrasonic diagnostic images.

23. The ultrasonic diagnostic imaging system of claim 22, wherein said ultrasonic image signal processor comprises a personal computer platform.

24. The ultrasonic diagnostic imaging system of claim 22, wherein said object oriented ultrasonic diagnostic image processing software comprises:
  acquisition objects associated with acquired ultrasonic image data;
  estimate objects associated with signal processed ultrasonic image data; and
  raster image objects associated with scan converted ultrasonic image data.

25. The ultrasonic diagnostic imaging system of claim 24, wherein said acquisition objects are associated with beamformed RF ultrasonic image data.

26. The ultrasonic diagnostic imaging system of claim 24, wherein said estimate objects are associated with two dimensional (2D) or Doppler processed ultrasonic image data.

27. The ultrasonic diagnostic imaging system of claim 24, wherein said object oriented software includes 2D objects associated with two dimensional (2D) ultrasonic data, and Doppler objects associated with Doppler ultrasonic data.

28. The ultrasonic diagnostic imaging system of claim 24, wherein said objects further include attributes defining characteristics of the ultrasonic image data with which they are associated.

29. The ultrasonic diagnostic imaging system of claim 28, wherein said software further comprises:
  an acquisition task for processing acquired ultrasonic image data in accordance with the attributes of an associated acquisition object;
  a signal processing task for processing ultrasonic image data in accordance with the attributes of an associated estimate object; and
  a display task for processing ultrasonic image data in accordance with the attributes of an associated raster image object.

30. The ultrasonic diagnostic imaging system of claim 22, wherein said object oriented ultrasonic diagnostic image processing software comprises a plurality of data objects which are associated with ultrasonic data sets, said data objects including attributes defining characteristics of said associated ultrasonic data sets.

31. A personal computer based ultrasonic diagnostic imaging system, comprising:
  an ultrasonic imaging probe;
  a beamformer coupled to said probe and producing digital rayline signals in response to echo signals received from said probe;
  a dual port memory coupled to said beamformer for storing said digital rayline signals;
  a personal computer platform, coupled to said dual port memory, for processing said digital rayline signals to produce ultrasonic diagnostic image signals; and
  a display coupled to said personal computer platform for displaying ultrasonic diagnostic images.

32. The ultrasonic diagnostic imaging system of claim 31, further comprising a dual port memory, coupled to said personal computer platform and said display, for storing said ultrasonic diagnostic image signals.

33. A personal computer based ultrasonic diagnostic imaging system, comprising:
  an ultrasonic imaging probe;
  means coupled to said probe for producing digital echo signals in response to echo signals received from said probe;
  a personal computer platform, coupled to said digital echo signal producing means, for processing said digital echo signals to produce ultrasonic diagnostic image signals; and
  a display coupled to said personal computer platform for displaying ultrasonic diagnostic images.

34. The personal computer based ultrasonic diagnostic imaging system of claim 33, wherein said personal computer platform includes a central processing unit (CPU), a digital signal processor, and a dual port memory which is accessed by both said CPU and said digital signal processor.

35. The personal computer based ultrasonic diagnostic imaging system of claim 33, wherein said personal computer platform includes a multiple image memory which stores a sequence of digital ultrasonic image data sets.

36. The personal computer based ultrasonic diagnostic imaging system of claim 35, wherein said means for producing digital echo signals comprises a beamformer, and wherein said multiple image memory is coupled to store sequences of digital ultrasonic image data sets produced by said beamformer.

37. The personal computer based ultrasonic diagnostic imaging system of claim 35, wherein said personal computer platform further comprises digital echo signal processing software, and wherein said multiple image memory is coupled to store sequences of digital ultrasonic image data sets which have been processed by said personal computer platform under control of said software.

38. The personal computer based ultrasonic diagnostic imaging system of claim 33, wherein said personal computer platform includes a central processing unit (CPU) and a digital signal processor operated under control of said CPU for simultaneously performing two dimensional (2D) and Doppler signal processing.

39. The ultrasonic diagnostic imaging system of claim 38, wherein said personal computer platform further includes an expansion bus, said digital signal processor is coupled to said expansion bus, and said digital signal processor performs Doppler signal processing while said CPU performs 2D signal processing.

40. The ultrasonic diagnostic imaging system of claim 39, wherein said means for producing digital echo signals comprises a beamformer which produces 2D and Doppler digital echo data sets, and wherein said personal computer platform further includes software for preferentially signal processing Doppler digital echo data sets before processing 2D digital echo data sets.

41. The ultrasonic diagnostic imaging system of claim 40, wherein said personal computer platform further includes software for scan converting Doppler and 2D digital echo data set, wherein said scan converting software preferentially scan converts 2D digital echo data for a given ultrasonic image before scan converting Doppler digital echo data for said given ultrasonic image.

42. The personal computer based ultrasonic diagnostic imaging system of claim 33, further comprising:
  a user interface coupled to the keyboard input of said personal computer platform.

43. The personal computer based ultrasonic diagnostic imaging system of claim 33, further comprising:
  a user interface coupled to said personal computer platform, including a trackball control coupled to the mouse input of said personal computer platform.

44. The personal computer based ultrasonic diagnostic imaging system of claim 33, further comprising:
  a user interface coupled to said personal computer platform, including a plurality of controls for controlling parameters of said displayed ultrasonic diagnostic images,
  wherein said controls are increment/decrement controls for incrementing or decrementing said parameters in predetermined units of change.

45. The ultrasonic diagnostic imaging system of claim 44, wherein said controls comprise paddle switches.

46. The ultrasonic diagnostic imaging system of claim 44, wherein said controls comprise softkeys.

47. A personal computer based ultrasonic diagnostic imaging system, comprising:

an ultrasonic imaging probe;

a beamformer coupled to said probe and producing digital ultrasonic Doppler signals in response to quadrature sampling of echo signals received from said probe;

a personal computer platform, coupled to said beamformer, for processing said digital ultrasonic Doppler signals to produce ultrasonic diagnostic image signals; and a display coupled to said personal computer platform for displaying ultrasonic diagnostic images.

48. An ultrasonic diagnostic imaging system with a personal computer architecture comprising:

a beamformer to which ultrasonic probes may be removably connected for acquiring ultrasonic two dimensional (2D) or Doppler echo signals and producing groups of digital 2D or Doppler rayline signals which together comprise one image data set;

a personal computer platform coupled to receive said groups of digital rayline signals and including a central processing unit (CPU) for executing software which signal processes and display processes said digital rayline signals for display; and a display coupled to receive processed rayline signals for display of a 2D or Doppler ultrasonic image, wherein the number of rayline signals of a group is chosen to effect a correspondence between the time required by the beamformer to acquire and produce said group of 2D or Doppler rayline signals and the time utilized by said software to process said group of 2D or Doppler rayline signals.

49. A personal computer based ultrasonic diagnostic imaging system, comprising:

an ultrasonic imaging probe;

a beamformer coupled to said probe for controlling said probe to transmit periodic ultrasonic pulses and producing digital rayline signals in response to echo signals received from said probe;

a personal computer platform, coupled to said beamformer, and including a central processing unit (CPU) which executes software to process said digital rayline signals to produce ultrasonic diagnostic image signals; and a display coupled to said personal computer platform for displaying ultrasonic diagnostic images, wherein said personal computer platform further includes a monitor which monitors the time to process said digital rayline signals, wherein said periodic transmission of ultrasonic pulses is adjusted in response to said monitoring.

50. A personal computer based ultrasonic diagnostic imaging system, comprising:

an ultrasonic imaging probe;

means coupled to said probe for producing temporally separated digital echo signals in response to echo signals received from said probe;

a personal computer platform, coupled to said means for producing digital echo signals, for processing said digital echo signals to produce temporally discrete ultrasonic diagnostic image signals;

a display coupled to said personal computer platform for displaying an ultrasonic diagnostic image of temporally discrete ultrasonic information, wherein said ultrasonic diagnostic image of temporally discrete ultrasonic information is a sweeping display in which older information is sequentially replaced with new information.

51. The ultrasonic diagnostic imaging system of claim 50, wherein said sweeping display is an M-mode display.

52. The ultrasonic diagnostic imaging system of claim 50, wherein said sweeping display is a spectral Doppler display.

53. The ultrasonic diagnostic imaging system of claim 50, wherein said means for producing temporally separated digital echo signals further comprises means for producing time interleaved digital 2D echo signals;

wherein said personal computer platform further includes software for processing said 2D echo signals to produce 2D ultrasonic diagnostic image data; and wherein said display further comprises means for simultaneously displaying a 2D ultrasonic diagnostic image and a sweeping display of temporally discrete ultrasonic diagnostic information.

54. A personal computer based ultrasonic diagnostic imaging system, comprising:

an ultrasonic imaging probe;

means coupled to said probe for producing, at a first rate, sets of digital echo signals, each set of digital echo signals comprising acquisition data for an image frame;

a personal computer platform, coupled to said means for producing digital echo signals, for display processing sets of said digital echo signals to produce ultrasonic diagnostic image data sets at a second rate; and a display coupled to said personal computer platform for displaying ultrasonic diagnostic images, wherein said first rate is greater than said second rate.

55. The personal computer based ultrasonic diagnostic imaging system of claim 54, wherein the disparity between said first rate and said second rate is a function of the time said personal computer platform utilizes to perform said display processing of a set of said digital echo signals.

56. The personal computer based ultrasonic diagnostic imaging system of claim 54, further comprising an image data memory for storing a sequence of said sets of digital echo signals produced by said means for producing sets of digital echo signals; and further comprising means for display processing said stored sequence for display as an ultrasonic image sequence.

57. The personal computer based ultrasonic diagnostic imaging system of claim 56, wherein said image data memory is coupled to store acquisition data sets produced by said means for producing sets of digital echo signals.

58. The personal computer based ultrasonic diagnostic imaging system of claim 56, wherein said personal computer platform further includes software for ultrasonic signal processing sets of said acquisition data to produce processed data sets, each corresponding to an ultrasonic image, wherein said image data memory is coupled to store a sequence of said processed data sets.

59. The personal computer based ultrasonic diagnostic imaging system of claim 58, wherein said processed data sets are produced at a rate which is greater than said second rate.

60. A personal computer based ultrasonic diagnostic imaging system, comprising:

an ultrasonic imaging probe;

means coupled to said probe for producing digital echo signals in response to echo signals received from said probe;

a personal computer platform, coupled to said means for producing digital echo signals, and including software for display processing digital echo signals to produce ultrasonic diagnostic image signals;

a display coupled to said personal computer platform for displaying ultrasonic diagnostic images, wherein said display processing software includes means for scan converting said digital echo signals to a desired image format, and means for mapping said digital echo signals to a desired range of display values.

61. An ultrasonic diagnostic imaging system with a personal computer based architecture comprising:

an ultrasonic imaging probe;

a personal computer platform, connectable to said ultrasonic imaging probe, and including:

memory means for storing ultrasonic diagnostic image signal processing software;

a central processing unit (CPU) which executes software tasks which perform ultrasonic diagnostic image signal processing; and a multitasking scheduler which schedules the execution of said software tasks by said CPU in a time interleaved manner; and a display coupled to said personal computer platform for displaying ultrasonic diagnostic images.

62. The ultrasonic diagnostic imaging system of claim 61, wherein said multitasking scheduler is responsive to the occurrence of events for scheduling the execution of said software tasks by said CPU.

63. The ultrasonic diagnostic imaging system of claim 62, wherein said events include the readiness of ultrasound data for processing by a software task.

64. The ultrasonic diagnostic imaging system of claim 62, wherein said multitasking scheduler is further responsive to the occurrence of an event for interrupting the execution of a currently executing software task and executing a software task which responds to said event.

65. The ultrasonic diagnostic imaging system of claim 62, wherein said events are assigned predetermined priorities for response, and wherein said multitasking scheduler schedules software tasks for execution in consideration of said priorities.

66. The ultrasonic diagnostic imaging system of claim 65, wherein a plurality of events are assigned a common priority, and wherein said multitasking scheduler executes tasks responding to events of a common priority in a time interleaved manner.

67. The ultrasonic diagnostic imaging system of claim 66, wherein said multitasking scheduler interrupts the execution of a software task after a predetermined quantum of execution time to execute another software task responding to an event of a common priority and which is awaiting execution by said CPU.

68. The ultrasonic diagnostic imaging system of claim 67, wherein said software tasks which perform ultrasonic diagnostic image signal processing include software tasks which perform ultrasonic display processing.

69. The ultrasonic diagnostic imaging system of claim 61, wherein said multitasking scheduler interrupts the execution of an executing software task after a predetermined quantum of time.

* * * * *